(12) United States Patent
Sato et al.

(10) Patent No.: US 10,044,966 B2
(45) Date of Patent: *Aug. 7, 2018

(54) MONITORING CAMERA SYSTEM

(71) Applicant: Panasonic Intellectual Property Management Co., Ltd., Osaka (JP)

(72) Inventors: Keizo Sato, Fukuoka (JP); Mitsuru Kawamura, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 130 days.

This patent is subject to a terminal disclaimer.

(21) Appl. No.: 14/665,887

(22) Filed: Mar. 23, 2015

(65) Prior Publication Data

US 2015/0296165 A1 Oct. 15, 2015

(30) Foreign Application Priority Data

Apr. 15, 2014 (JP) ................................. 2014-083627

(51) Int. Cl.
  H04N 7/18 (2006.01)
  H04N 5/44 (2011.01)
  G08B 25/08 (2006.01)
(52) U.S. Cl.
  CPC ............... H04N 5/44 (2013.01); G08B 25/08 (2013.01); H04N 7/185 (2013.01)
(58) Field of Classification Search
  None
  See application file for complete search history.

(56) References Cited

U.S. PATENT DOCUMENTS 6,826,607 B1 * 11/2004 Gelvin ............... B60R 25/1004
  340/539.19
6,956,478 B2  10/2005 Oyagi et al.
(Continued)

FOREIGN PATENT DOCUMENTS

JP      10-40485 A    2/1998
JP   2000-099862 A    4/2000
(Continued)

OTHER PUBLICATIONS

International Search Report, dated Jun. 24, 2015, for corresponding PCT Application No. PCT/JP2015/001262, 22 pages.
(Continued)

*Primary Examiner* — Mohammed Rahaman
(74) *Attorney, Agent, or Firm* — Seed IP Law Group LLP

(57) ABSTRACT

A master device transmits received image data to a mobile phone terminal and includes a storage unit that stores sensor setting information including at least sensitivity or a threshold value of a sensor, the mobile phone terminal includes a display and input unit, displays the image data transmitted from the master device on the display and input unit, requests the master device to provide the sensor setting information when receiving a predetermined operation, displays the sensor setting information transmitted from the master device on the display and input unit, and transmits the changed sensor setting information to the master device when receiving an operation of changing the sensor setting information, and the master device updates the sensor setting information stored in the storage unit using the sensor setting information after changing transmitted from the mobile phone terminal.

14 Claims, 22 Drawing Sheets

(56) References Cited

U.S. PATENT DOCUMENTS

| | | | | |
|---|---|---|---|---|
| 2002/0126009 | A1* | 9/2002 | Oyagi | G08B 25/10 340/541 |
| 2003/0112139 | A1 | 6/2003 | Matsui et al. | |
| 2004/0227817 | A1* | 11/2004 | Oya | G06F 3/017 348/155 |
| 2004/0246128 | A1* | 12/2004 | Menard | A61B 5/0002 340/539.19 |
| 2006/0209176 | A1* | 9/2006 | Nakamura | G08B 25/10 348/14.01 |
| 2007/0279214 | A1* | 12/2007 | Buehler | G08B 13/19615 340/521 |
| 2007/0282177 | A1* | 12/2007 | Pilz | A61B 5/411 600/301 |
| 2009/0261943 | A1* | 10/2009 | Jana | G08B 25/08 340/3.1 |
| 2010/0023865 | A1* | 1/2010 | Fulker | G06F 3/04817 715/734 |
| 2010/0117849 | A1* | 5/2010 | Clayton | G06F 21/554 340/691.6 |
| 2011/0176011 | A1* | 7/2011 | Swamidas | G08B 13/19656 348/207.11 |

FOREIGN PATENT DOCUMENTS

| | | |
|---|---|---|
| JP | 2002-271522 A | 9/2002 |
| JP | 2003-162781 A | 6/2003 |
| JP | 2003-228780 A | 8/2003 |
| JP | 2004-104240 A | 4/2004 |
| JP | 2004-240839 A | 8/2004 |
| JP | 2005-092809 A | 4/2005 |
| JP | 2005-128588 A | 5/2005 |
| JP | 2005-333305 A | 12/2005 |
| JP | 2007-179555 A | 7/2007 |
| JP | 2008-310705 A | 12/2008 |
| WO | 02-29749 A1 | 4/2002 |

OTHER PUBLICATIONS

Dragomir et al.,"WSN Management in a multi-user secure context," Roedunet International Conference (RoEduNet), 2013 11th, IEEE, Jan. 17, 2013, 4 pages.

Saha et al., "On Security of a Home Energy Management System," IEEE PES Innovative Smart Grid Technologies, Europe, Oct. 12-15, 2014, 5 pages.

* cited by examiner

FIG. 7

| SENSOR SETTING INFORMATION ||||| 71 |
|---|---|---|---|---|---|
| SENSOR | GROUP | SENSOR SETTING VALUE ||||
| | | SENSITIVITY | THRESHOLD VALUE | ON/OFF | OPERATING TIME |
| a | A | 4 | 3 | ON | 22:00 −7:00 |
| b | B | 3 | 4 | ON | 9:00 −16:00 |
| c | C | 4 | 2 | ON | 22:00 −7:00 |
| d | C | 4 | 4 | ON | 22:00 −7:00 |
| e | C | 4 | 2 | ON | 22:00 −7:00 |
| f | B | 3 | 4 | ON | 9:00 −16:00 |

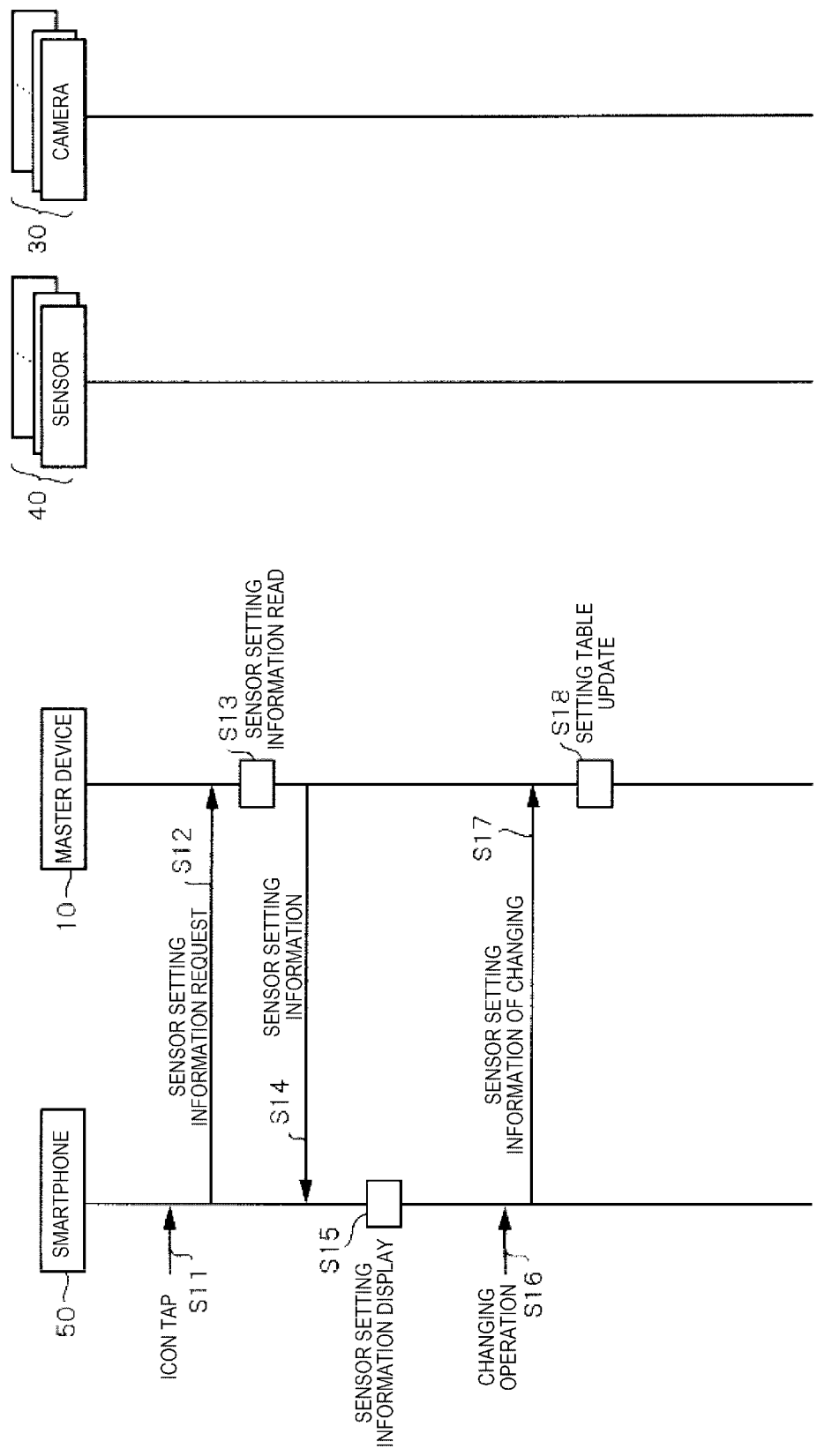

| ASSOCIATION TABLE | | |
|---|---|---|
| ZONE A | CAMERA AA | SENSOR a |
| ZONE B | CAMERA BB | SENSOR b, SENSOR f |
| ZONE C | CAMERA CC | SENSOR e, SENSOR d |
| | CAMERA DD | SENSOR c |

FIG. 17A

ASSOCIATION TABLE — 75A

| ZONE | CAMERA | SENSOR |
|---|---|---|
| ZONE A | CAMERA AA | SENSOR a, SENSOR d |
| ZONE B | CAMERA BB | SENSOR b, SENSOR f |
| ZONE C | CAMERA CC | SENSOR e |
| | CAMERA DD | SENSOR c |

FIG. 17B

SENSOR SETTING INFORMATION — 71A

| | ZONE DIVISION | SENSOR SETTING VALUE | | | |
|---|---|---|---|---|---|
| | | SENSITIVITY | THRESHOLD VALUE | ON/OFF | OPERATING TIME |
| SENSOR a | ZONE A | 4 | 2 | ON | 22:00 −7:00 |
| SENSOR b | ZONE B | 3 | 4 | ON | 9:00 −16:00 |
| SENSOR c | ZONE C | 4 | 2 | ON | 22:00 −7:00 |
| SENSOR d | ZONE C→A | 4 | 4 | ON | 22:00 −7:00 |
| SENSOR e | ZONE C | 4 | 2 | ON | 22:00 −7:00 |
| SENSOR f | ZONE B | 3 | 4 | ON | 9:00 −16:00 |

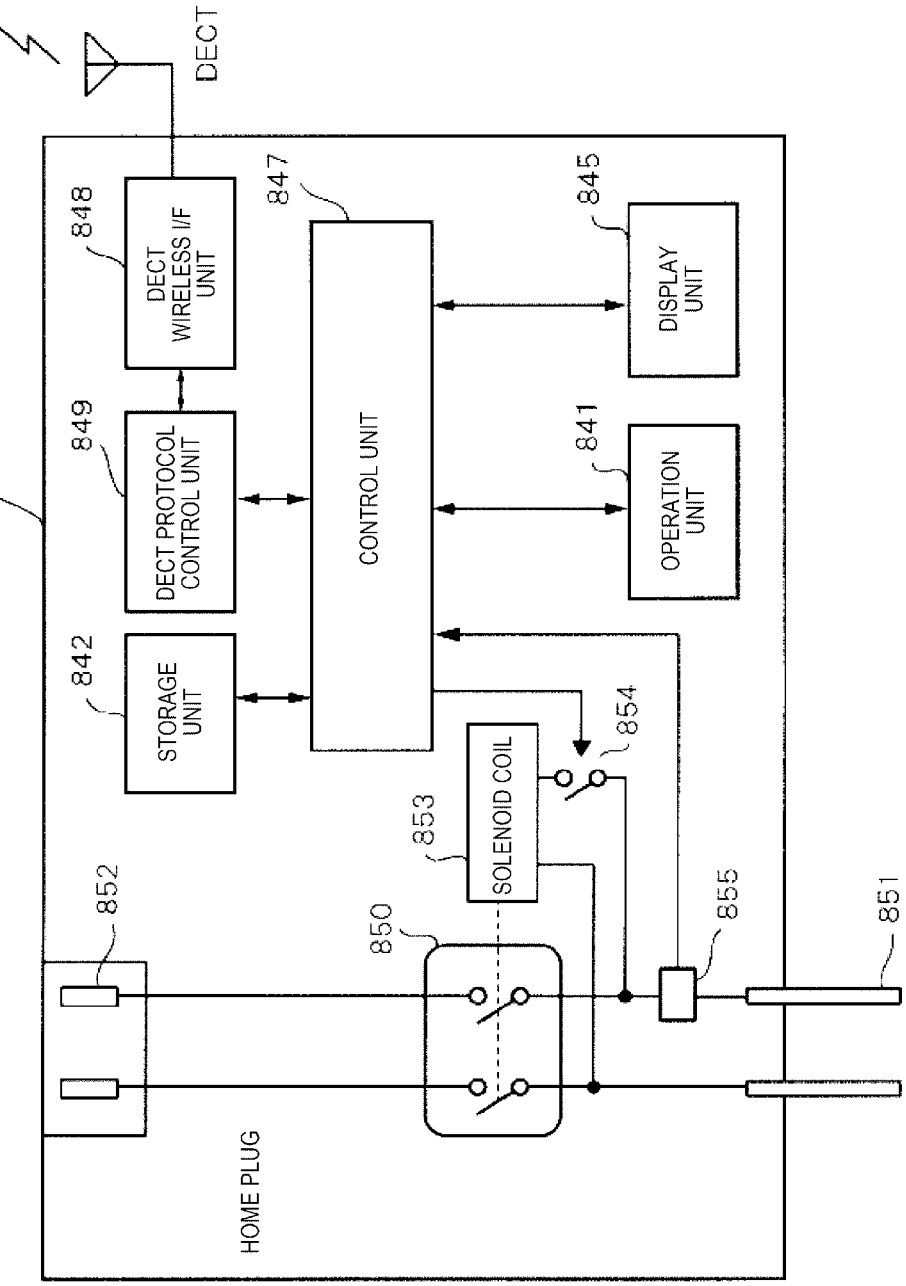

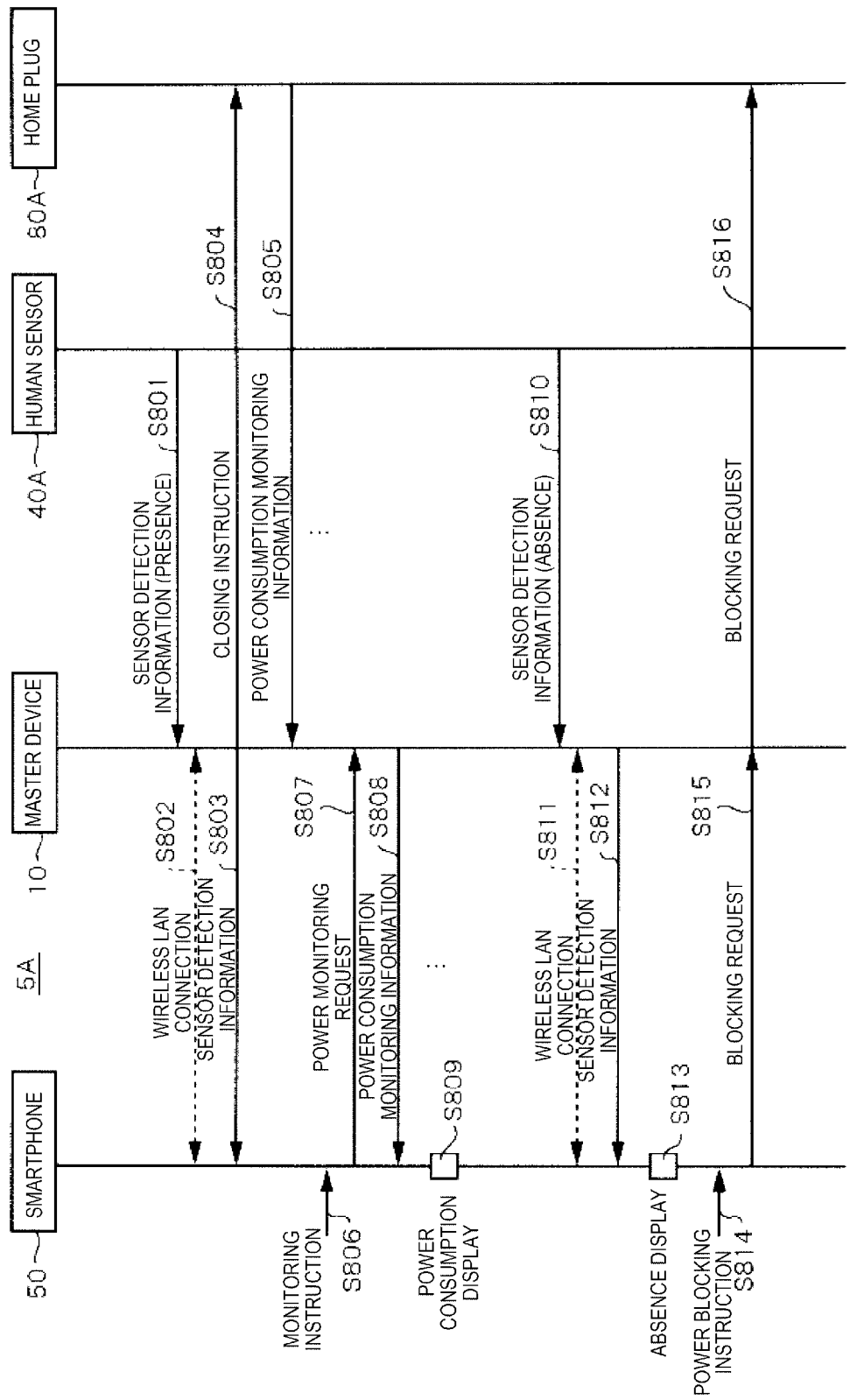

| GROUP | SENSOR | SENSOR SETTING VALUE ||||
|---|---|---|---|---|---|
| | | SENSITIVITY | THRESHOLD VALUE | ON/OFF | OPERATING TIME |
| A | d | 4 | 4 | ON | 22:00 −7:00 |
| B | b | 3 | 4 | ON | 9:00 −16:00 |
| | f | 3 | 4 | ON | 9:00 −16:00 |
| C | c | 4 | 2 | ON | 22:00 −7:00 |
| | e | 4 | 2 | ON | 22:00 −7:00 |
| D | a | 4 | 2 | ON | 22:00 −7:00 |

SENSOR SETTING INFORMATION

HOME PLUG SETTING INFORMATION

| GROUP | HOME PLUG | ON/OFF SETTING |
|---|---|---|
| ⋮ | ⋮ | ⋮ |
| D | A1 | ON |
| | B1 | OFF |
| | C1 | ON |
| E | D1 | ON |
| ⋮ | ⋮ | ⋮ |

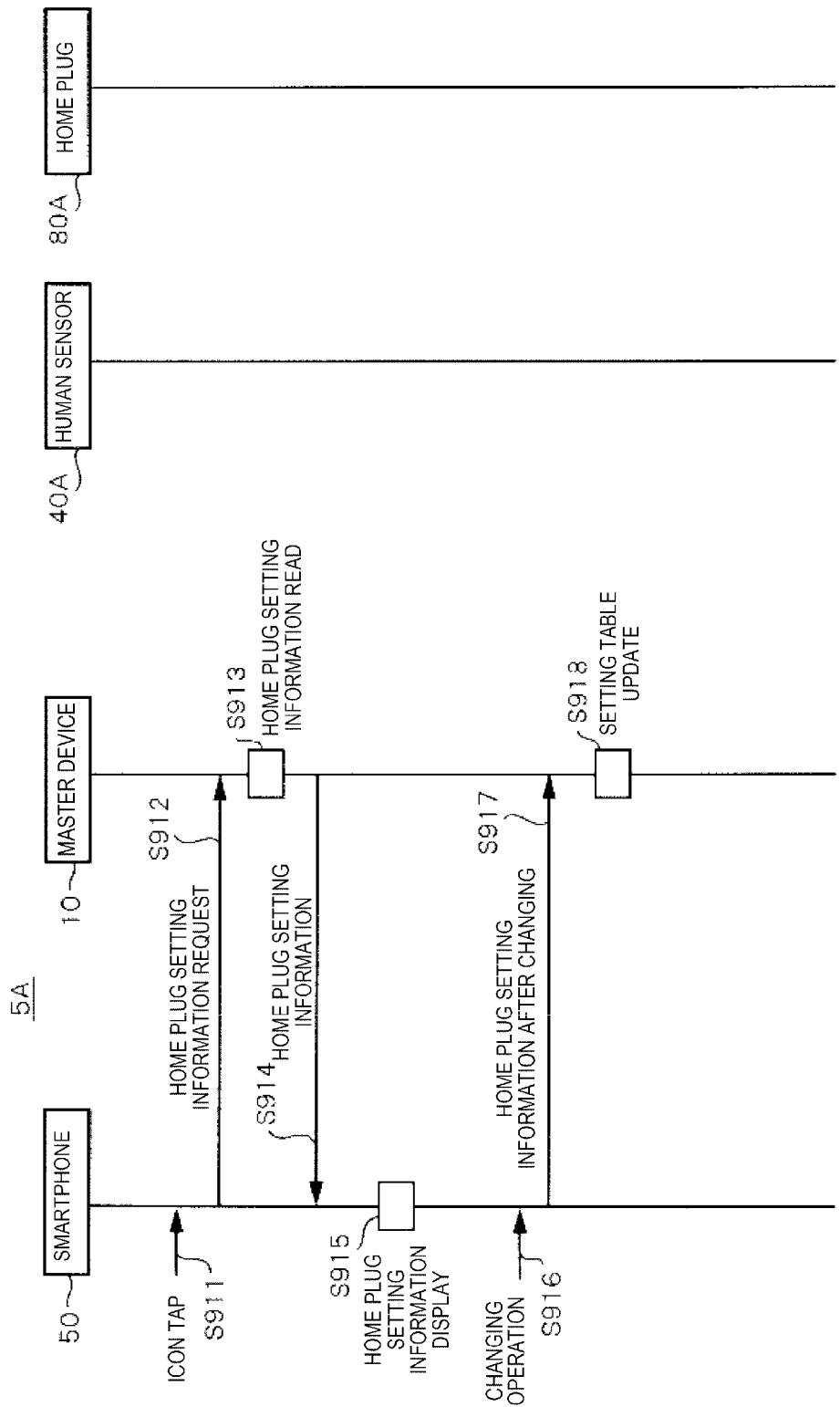

MONITORING CAMERA SYSTEM

BACKGROUND OF THE INVENTION

1. Field of the Invention

The present invention relates to a monitoring camera system that performs transmission and reception of information or data to and from a monitoring camera and a sensor.

2. Description of the Related Art

A monitoring camera system that monitors an intruder entering a site of a house is conventionally known as an example of a communication system that performs transmission or reception of information or data with a sensor. For example, a monitoring camera system shown in Japanese Patent Unexamined Publication No. 2000-99862 includes a home server capable of recording a video or an audio, an infrared sensor, a video camera, and a microphone. When the infrared sensor detects an intruder, the home server records a video regarding the intruder and an audio regarding the intruder using the video camera and the microphone.

However, in Patent Unexamined Publication No. 2000-99862 described above, a setting value of the sensor including a threshold value used to determine that the sensor has detected a target (for example, an intruder) is not a value considering actual individual circumstances of a user, but is often uniformly set to a fixed value (default value), for example, in a specification or the like.

In other words, a case in which a user actually confirms an operation in which a sensor actually installed indoors, outdoors, or the like detects a target (for example, an intruder), and then, a setting value of the sensor is changed after actual use of the sensor is started is not assumed. Therefore, the setting value may not meet actual individual circumstances of the user, or the sensor may not operate as expected by the user.

Further, when the user changes the setting value (for example, sensitivity, and the threshold value) of the sensor into an appropriate setting value while actually confirming that the sensor detects the target (for example, an intruder), work of the user performing setting and changing while coming and going from and to an installation place of the sensor and an installation place of a receiver (for example, master device) that receives information (for example, information indicating abnormality) detected by the sensor occurs, and thus, there are problems in that complicated work is required for the user, and convenience for the user deteriorates. Particularly, when a large number of sensors are installed, an individual setting should be performed for each sensor, and setting work of the user increases. Further, work regarding a setting of a controlled device used in association with the sensor also increases.

SUMMARY OF THE INVENTION

An object of the present invention is to provide a communication system that simplifies an operation of setting and updating sensor setting information of at least one installed sensor or setting information of a controlled unit so as to solve the conventional problems described above.

According to an aspect of the present invention, there is provided a monitoring camera system including: a sensor; a monitoring camera including an imaging unit and having a telephone call function; a master device capable of communicating with the monitoring camera, the master device being connected to a fixed telephone network and capable of performing a telephone call with another fixed telephone; and a mobile phone terminal capable of wireless communication with the master device using a wireless router, the mobile phone terminal connecting to the other mobile phone over a mobile phone network, in which the monitoring camera transmits image data obtained by the imaging unit to the master device when the sensor detects a target, the master device transmits the received image data to the mobile phone terminal and includes a storage unit that stores sensor setting information including at least sensitivity or a threshold value of the sensor, the mobile phone terminal includes a display and input unit, displays the image data transmitted from the master device on the display and input unit, requests the master device to provide the sensor setting information when receiving a predetermined operation, displays the sensor setting information transmitted from the master device on the display and input unit, and transmits the changed sensor setting information to the master device when receiving an operation of changing the sensor setting information, and the master device updates the sensor setting information stored in the storage unit using the sensor setting information after changing transmitted from the mobile phone terminal.

Accordingly, the monitoring camera system of the present invention can simplify an operation of setting and updating the sensor setting information of the respective sensors installed in each group through an easily viewable display and input unit of the portable terminal carried by the user, and easily set and update the sensor setting information.

BRIEF DESCRIPTION OF DRAWINGS

FIG. 7 is a diagram illustrating an example of registration content of a setting table stored in a storage unit of the master device;

FIG. 8 is a sequence diagram illustrating a flow of a sensor setting operation in the monitoring camera system of the first embodiment;

FIG. 17A is a diagram illustrating an example of a change in registration content of an association table and a setting table after changing;

FIG. 17B is a diagram illustrating an example of a change in registration content of an association table and a setting table after changing;

FIG. 18 is a block diagram illustrating an example of an internal configuration of a home plug in a communication system of a fourth embodiment;

FIG. 19 is a sequence diagram illustrating a flow of power supply control of the fourth embodiment;

FIG. 20A illustrates registration content of a setting table of the fourth embodiment;

FIG. 20B illustrates registration content of a setting table of the fourth embodiment;

FIG. 21 is a sequence diagram illustrating a flow of a setting operation of a home plug in the communication system of the fourth embodiment;

DETAILED DESCRIPTION OF THE PREFERRED EMBODIMENTS

Hereinafter, each embodiment of a monitoring camera system according to the present invention will be described with reference to the drawings.

First Embodiment

Figure 1:
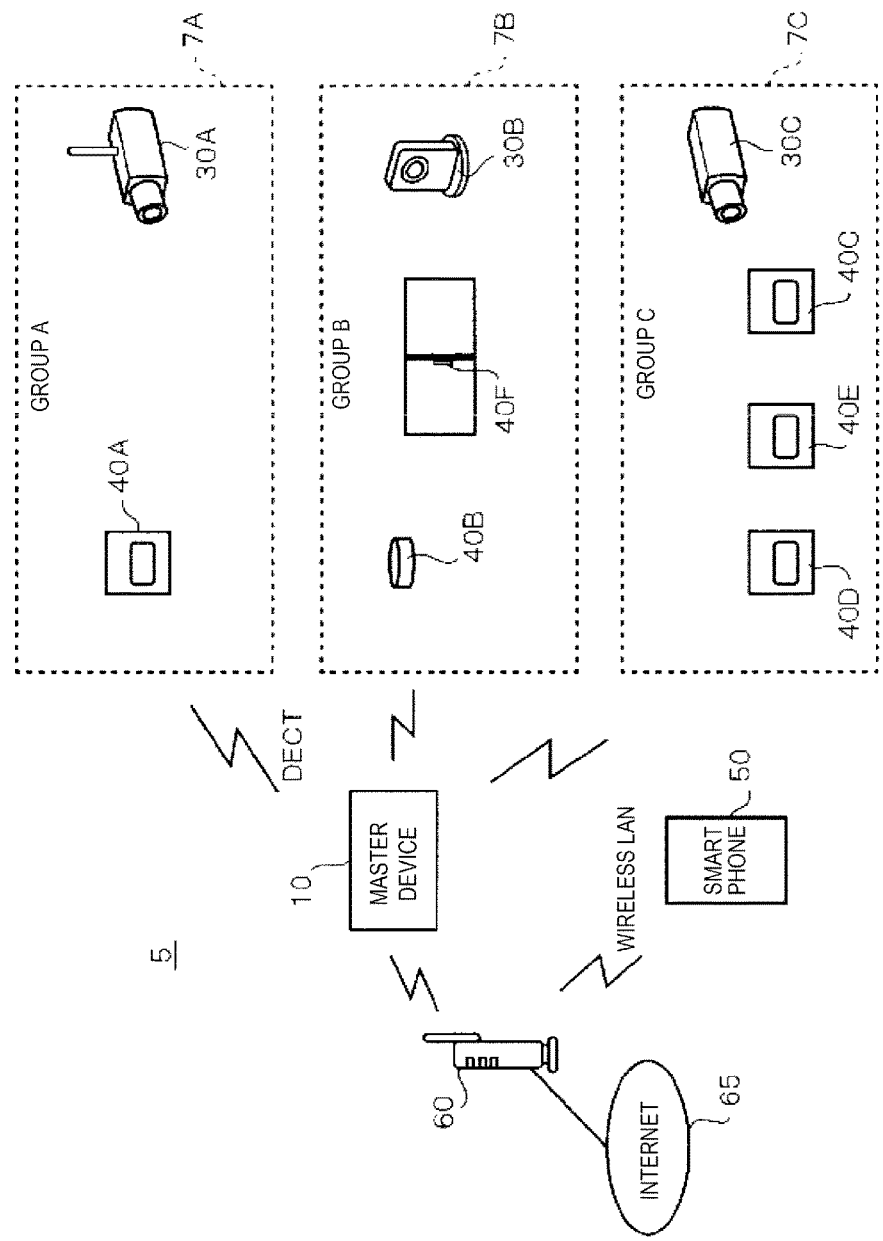
FIG. 1 is a schematic diagram illustrating a configuration of a monitoring camera system of a first embodiment.

FIG. 1 is a schematic diagram illustrating a configuration of monitoring camera system 5 of a first embodiment. Monitoring camera system 5 illustrated in FIG. 1 is configured to include master device 10 installed indoors and outdoors, three cameras 30 (specifically, monitoring cameras 30A and 30C, and indoor camera 30B), various sensors 40 (specifically, human sensor 40A, smoke sensor 40B, human sensors 40C, 40D, and 40E, and opening and closing sensor 40F), smartphone 50, and wireless router 60. A configuration of monitoring camera system 5 illustrated in FIG. 1 is an example, and can be changed in various aspects according to a use.

Master device (gateway) 10 is a control device that controls an entire operation of monitoring camera system 5, and is connected to be able to communicate with a slave device (not illustrated), the cameras, the sensors, or the like using a communication scheme of DECT (Digital Enhanced Cordless Telecommunications). Further, master device 10 is connected to Internet 65 (network) via wireless router 60 using a wireless LAN (Local Area Network).

Various sensors 40 (specifically, human sensor 40A, smoke sensor 40B, human sensors 40C, 40D, and 40E, and opening and closing sensor 40F) are connected to master device 10 using the DECT communication scheme. Here, opening and closing sensor 40F that detects opening and closing of a window, smoke sensor 40B that senses smoke, and human sensors 40A, 40C, 40D, and 40E that sense a person using infrared rays are used as sensors 40. Particularly, when it is not necessary to divide types of these sensors, the sensors are generally referred to as sensor 40. Further, infrared sensor 313 (see FIG. 4) built into camera 30 may be used as the human sensor, as described below.

Three cameras 30 (specifically, monitoring cameras 30A and 30C, and indoor camera 30B) have, for example, a telephone call function, and are connected to master device 10 in the DECT communication scheme. Here, monitoring cameras 30A and 30C that image outdoors and indoor camera 30B that images indoors are used as cameras. Particularly, when it is not necessary to divide types of cameras, the cameras are generally referred to as camera 30.

Smartphone 50 is connected to master device 10 via wireless router 60 using the wireless LAN, and also connected to a mobile phone, another smartphone, or the like over a mobile phone network using a communication scheme such as 3G (third generation).

Further, in respective embodiments including this embodiment, sensors 40 are grouped and various setting and switching of behavior are performed. In this embodiment, three groups are set in an imaging range of respective cameras 30. That is, one or a plurality of sensors included in the imaging range of a camera belong to the same group.

Hereinafter, for example, an imaging range of monitoring camera 30A installed in front of an entrance is group 7A, an imaging range of indoor camera 30B installed in a house is group 7B, and an imaging range of monitoring camera 30C installed at a garden is group 7C.

Human sensor 40A is installed in group 7A. Smoke sensor 40B and opening and closing sensor 40F are installed in group 7B. Three human sensors 40D, 40E, and 40C are installed in group 7C.

A setting of group 7A, group 7B, and group 7C is an example. Further, the group is not limited to be set according to one camera, and may be set in any range regardless of the camera. For example, the group may be set in a region including one or a plurality of sensors installed at close places.

Figure 2:
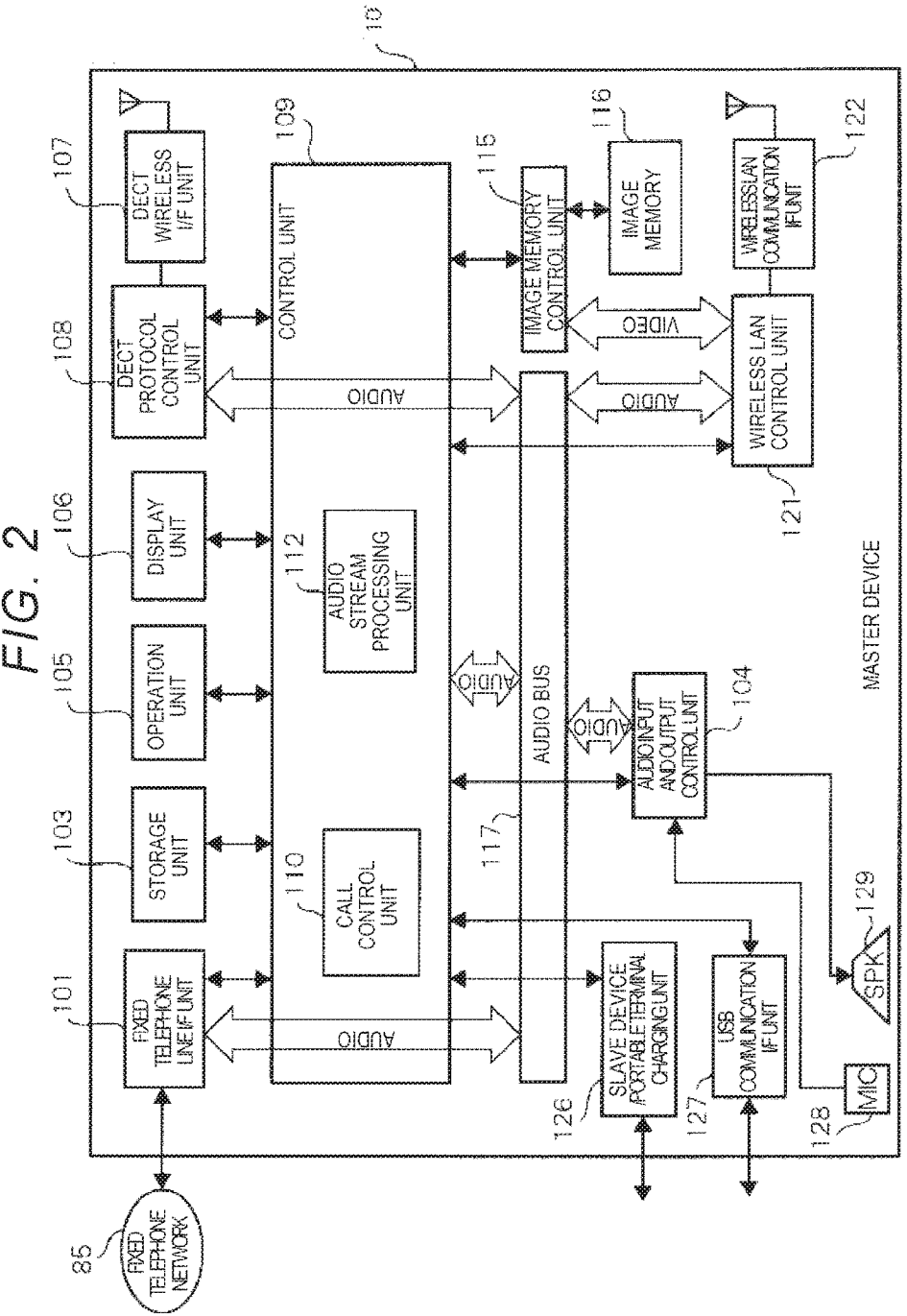
FIG. 2 is a block diagram illustrating an example of an internal configuration of a master device of each embodiment in detail.

FIG. 2 is a block diagram illustrating an example of an internal configuration of master device 10 of each embodiment. Master device 10 illustrated in FIG. 2 is configured to include control unit 109, storage unit 103, operation unit 105, and display unit 106. Master device 10 receives various input operations, and displays information such as an image on display unit 106. Control unit 109 includes call control unit 110 and audio stream processing unit 112 built thereinto, and performs, for example, processing of call control or audio data of a telephone call.

Further, master device 10 includes image memory control unit 115 and image memory 116, and stores image data or the like captured by camera 30 in image memory 116.

Further, master device 10 includes wireless LAN control unit 121, and wireless LAN communication I/F unit 122, and transmits and receives image data and audio data to and from smartphone 50, camera 30, or the like via wireless router 60 connected over the wireless LAN.

Further, master device 10 includes DECT protocol control unit 108, and DECT wireless I/F unit 107, and performs wireless connection to slave device (not illustrated), sensor 40, and camera 30 using a DECT (Digital Enhanced cordless Telecommunications) wireless scheme.

Further, master device 10 includes audio bus 117, audio input and output control unit 104, speaker 129, and microphone 128, and performs input and output of an audio to and from the outside.

Further, master device 10 includes fixed telephone line I/F unit 101, and can perform a telephone call with an external fixed telephone connected to fixed telephone network 85.

Further, master device 10 includes a slave device/portable terminal charging unit 126, and charges a slave device or smartphone 50 inserted in an insertion port.

Further, master device 10 includes USB communication I/F unit 127 and transmits or receives data to or from a device, a memory, or the like having an interface of a USB (Universal Serial Bus) standard.

Further, master device 10 stores setting table 71 (see FIG. 7) and association table 75 (see FIG. 13) to be described below in storage unit 103. A sensor setting value regarding the group of sensor 40 is registered in setting table 71 together with the group to which sensor 40 belongs. Sensor 40 associated with each camera 30 is registered in association table 75.

For example, since human sensor 40A and monitoring camera 30A are installed at a place on the entrance side, human sensor 40A and monitoring camera 30A are registered to be associated with each other. Further, since camera 30 includes infrared sensor 313 (see FIG. 4) which is a human sensor built thereinto as described below, human sensor 40A and monitoring camera 30A are registered to also be associated with infrared rays sensor 313. Further, since smoke sensor 40B and opening and closing sensor 40F are both installed inside a house, smoke sensor 40B and opening and closing sensor 40F are registered to be associated with indoor camera 30B.

Figure 3:
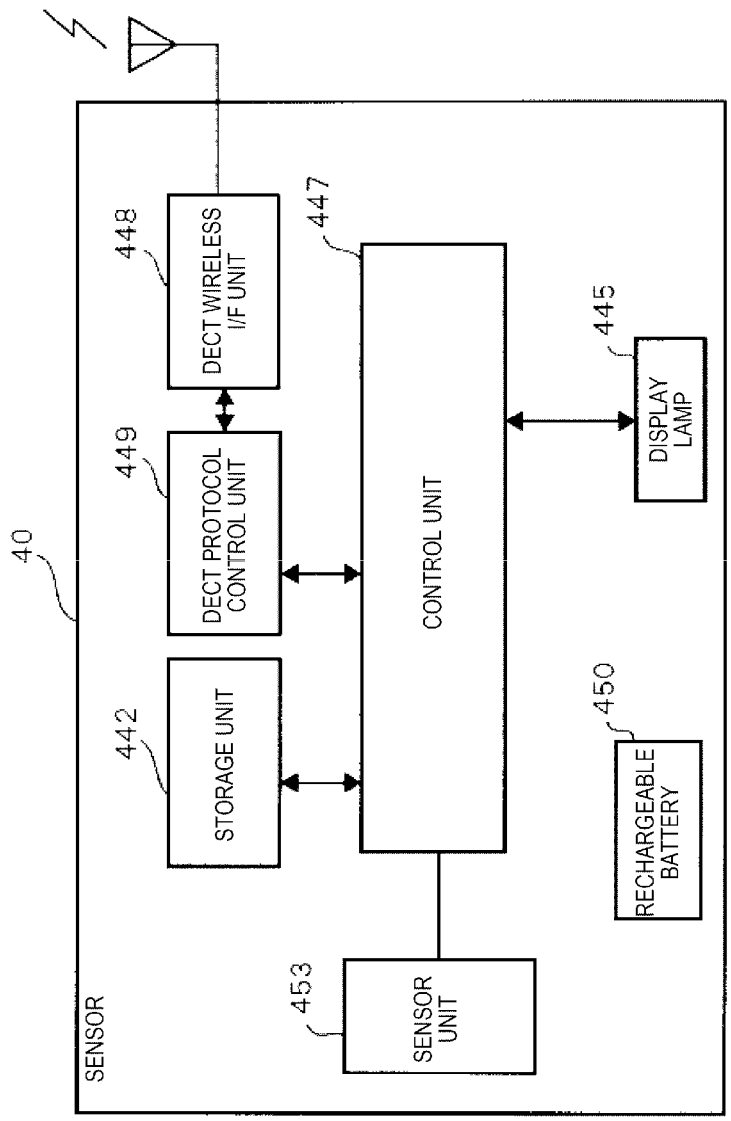
FIG. 3 is a block diagram illustrating an example of an internal configuration of a sensor of each embodiment in detail.

FIG. 3 is a block diagram illustrating an example of an internal configuration of sensor 40 of each embodiment. Sensor 40 illustrated in FIG. 3 includes control unit 447, storage unit 442, and display lamp 445. Settable or changeable sensor setting values such as sensitivity, a threshold value, an ON/OFF setting, and an operating time are registered in storage unit 442 as sensor 40 performs communication with smartphone 50 or master device 10, as described below.

When sensor 40 detects a target, sensor 40 performs a predetermined detection operation, for example, turns display lamp 445 ON. Further, sensor 40 includes DECT protocol control unit 449 and DECT wireless I/F unit 448, performs wireless connection to master device 10 in a DECT wireless scheme, and transmits sensor detection information to master device 10 when detecting the target.

Sensor unit 453 varies according to a type of sensor 40. For example, in the case of the human sensor, sensor unit 453 is a PIR (Passive Infrared Ray) sensor that senses a person using a change in infrared rays. In the case of opening and closing sensor 40F that detects opening and closing of a window or the like, sensor unit 453 is a reed switch switched to ON/OFF due to opening or closing. In the case of smoke sensor 40B, sensor unit 453 is a light emitting and receiving unit that senses smoke as emitted light is blocked by the smoke.

Rechargeable battery 450 is a battery that can be charged and supplies power to each unit.

Figure 4:
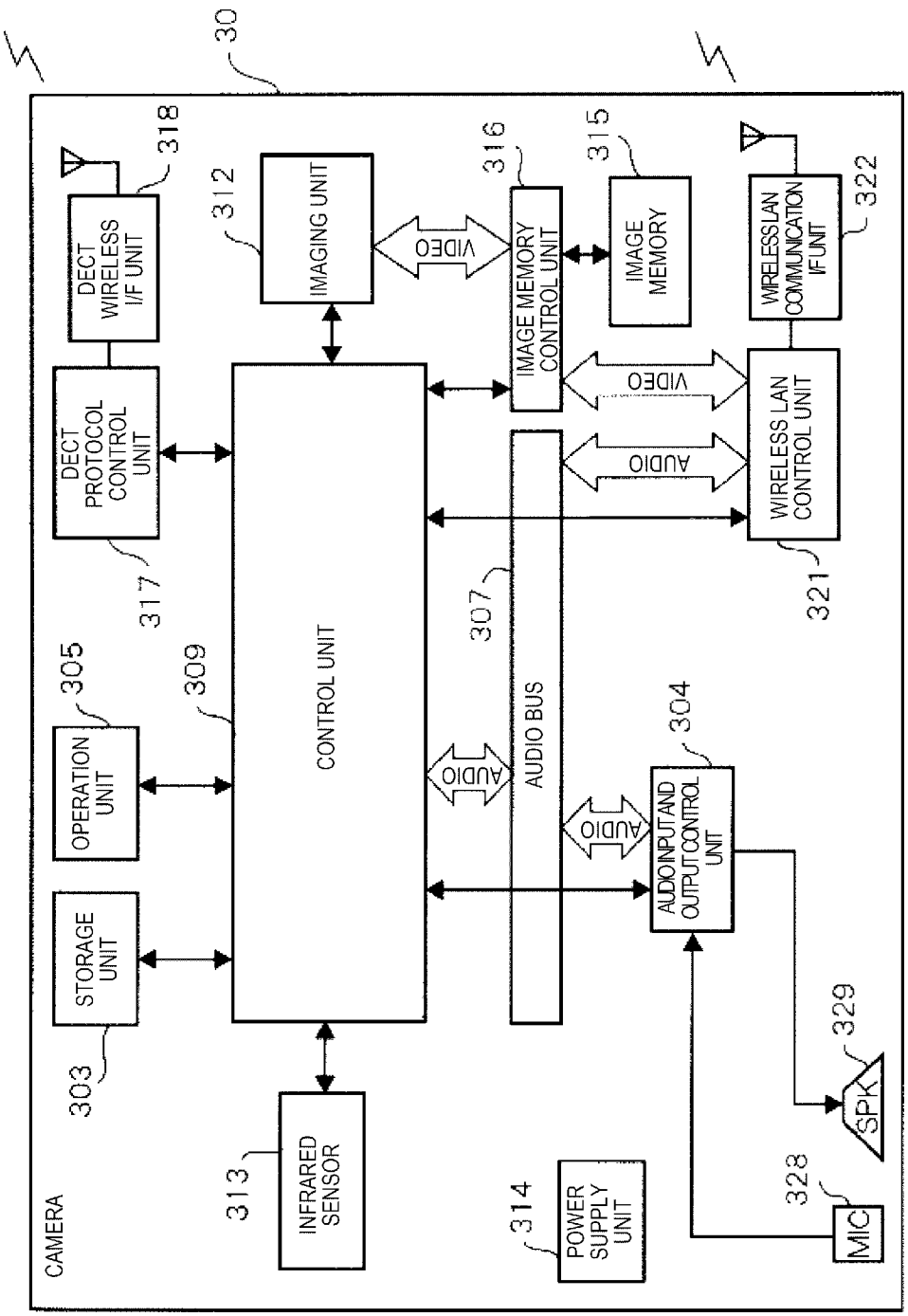
FIG. 4 is a block diagram illustrating an example of an internal configuration of a camera of each embodiment in detail.

FIG. 4 is a block diagram illustrating an example of an internal configuration of camera 30 of each embodiment. Cameras 30 (specifically, monitoring cameras 30A and 30C and indoor camera 30B) illustrated in FIG. 4 all have substantially the same specifications. Camera 30 is configured to include control unit 309, storage unit 303, and operation unit 305. Camera 30 performs an operation regarding imaging, and receives an input operation.

Further, camera 30 includes DECT protocol control unit 317, and DECT wireless I/F unit 318, and performs wireless connection to master device 10 using a wireless scheme of DECT.

Further, camera 30 includes wireless LAN control unit 321 and wireless LAN communication I/F unit 322, and transmits or receives image data and audio data to or from master device 10, smartphone 50, or the like via wireless router 60 connected over the wireless LAN.

Further, camera 30 includes audio bus 307, audio input and output control unit 304, speaker 329, and microphone 328, and inputs or outputs an audio to or from the outside.

Further, camera 30 includes imaging unit 312, image memory control unit 316, and image memory 315, and stores image data captured by imaging unit 312 in image memory 315. Imaging unit 312 includes a lens, and an imaging element.

Further, camera 30 includes, as a human sensor, an infrared sensor 313 which is a PIR sensor, integrally built thereinto. Infrared sensor 313 detects a change in heat (infrared rays) emitted by a person and senses presence of the person. Further, camera 30 has power supply unit 314 of which supplied power is commercial alternating current power.

Figure 5:
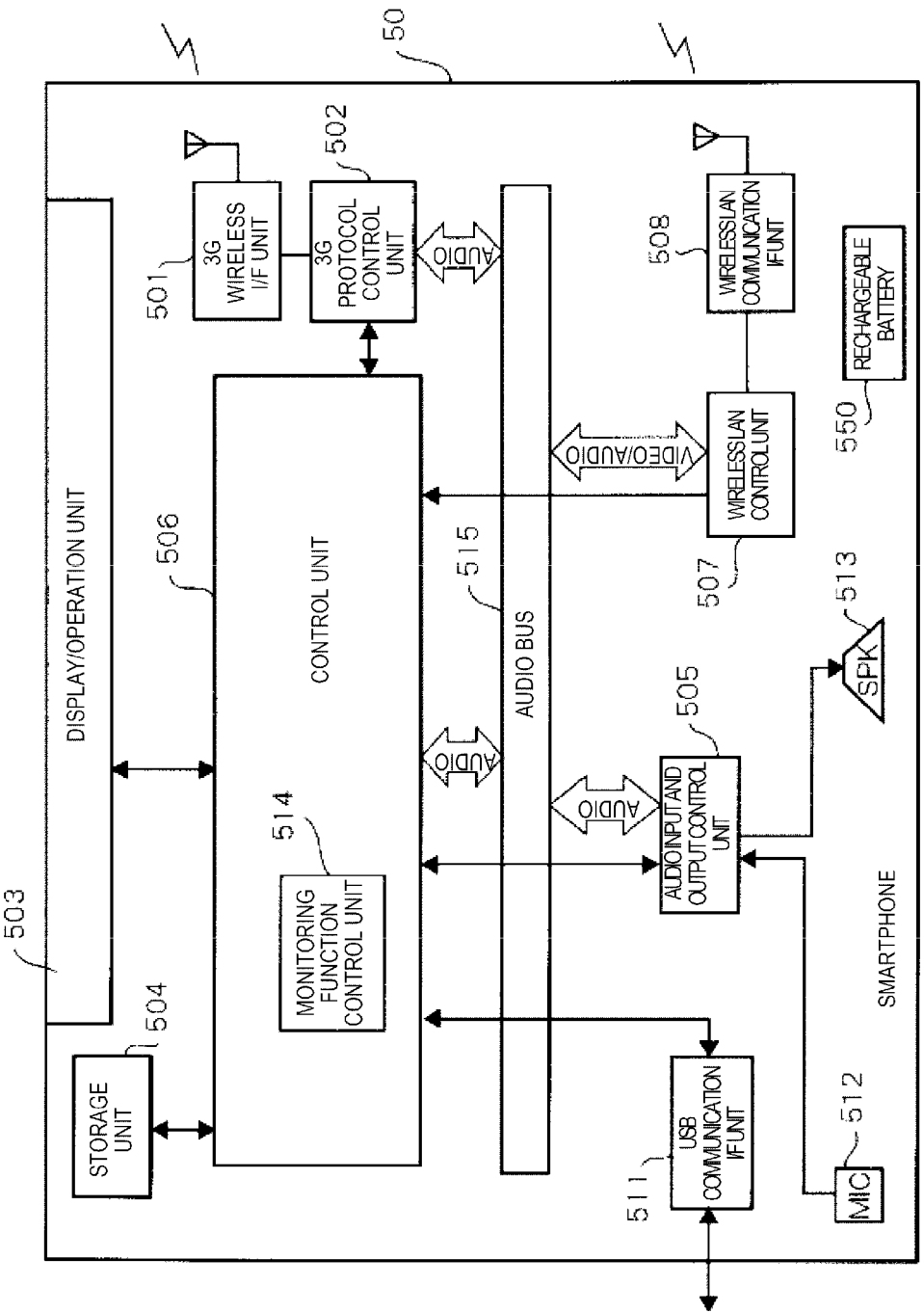
FIG. 5 is a block diagram illustrating an example of an internal configuration of a smartphone of each embodiment in detail.

FIG. 5 is a block diagram illustrating an example of an internal configuration of smartphone 50 of each embodiment. Smartphone 50 is configured to include control unit 506, storage unit 504, and display/operation unit (touch panel) 503. Smartphone 50 receives various input operations, and displays information such as an image on touch panel 503. Control unit 506 includes monitoring function control unit 514 that can set a function of camera 30. Touch panel 503 is a display and input unit in which a display unit and an operation unit are integrally formed, displays information such as an image or an icon on a screen, and receives a tap operation for the screen from the user.

Further, smartphone 50 includes a 3G protocol control unit 502 and a 3G wireless I/F unit 501, and performs wireless connection to a mobile phone or another smartphone connected to a mobile phone network using a wireless communication scheme of a 3G (third generation).

Further, smartphone 50 includes audio bus 515, audio input and output control unit 505, speaker 513, and microphone 512, and performs input and output of an audio to and from the outside.

Further, smartphone 50 includes wireless LAN control unit 507 and wireless LAN communication I/F unit 508, and transmits or receives image data and audio data to or from master device 10, camera 30 or the like via wireless router 60 connected over the wireless LAN.

Further, smartphone 50 includes a USB communication I/F unit 511, and transmits or receives data to or from a device, a memory or the like having an interface of a USB (Universal Serial Bus) standard.

An operation of monitoring camera system 5 of this embodiment having the configuration described above will be described.

Figure 6:
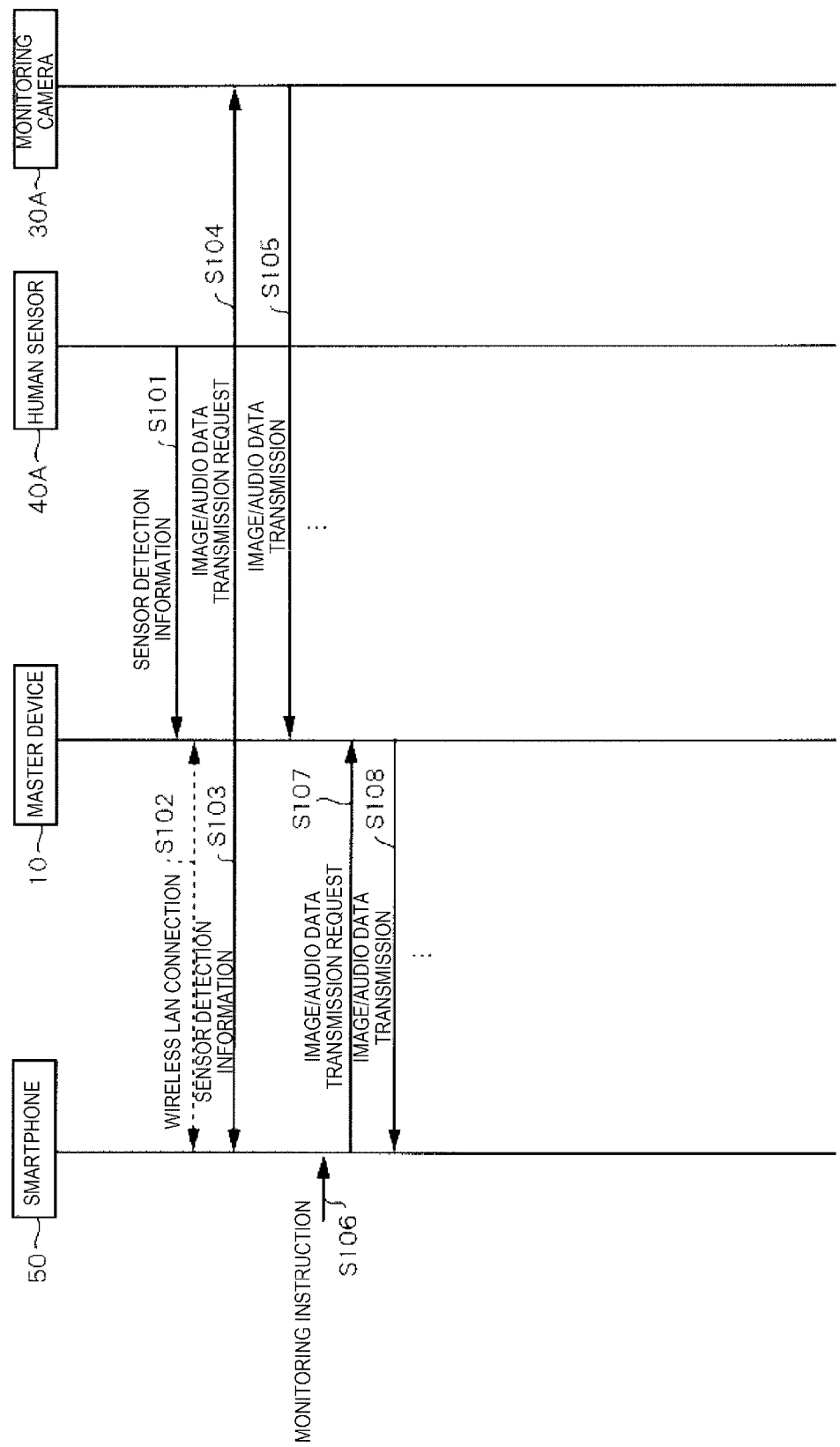
FIG. 6 is a sequence diagram illustrating a flow of a normal monitoring operation in the monitoring camera system of the first embodiment.

First, a normal monitoring operation in monitoring camera system 5 of this embodiment will be described with reference to FIG. 6. FIG. 6 is a sequence diagram illustrating a flow of the normal monitoring operation in monitoring camera system 5 of the first embodiment. For example, a case in which human sensor 40A and monitoring camera 30A are used for group 7A will be illustrated and described in FIG. 6.

In FIG. 6, when human sensor 40A detects a target such as a person present outdoors, human sensor 40A transmits sensor detection information including information indicating that the target has been detected and an output value of the sensor (for example, a detection level as a sensing result) to master device 10 (S101). When master device 10 receives sensor detection information from human sensor 40A, master device 10 wirelessly connects to smartphone 50 using the wireless LAN (S102). When the connection is completed, master device 10 transmits the sensor detection information to smartphone 50 (S103).

Further, master device 10 requests monitoring camera 30A to transmit image/audio data (S104). When monitoring camera 30A receives the request for transmission of image/audio data, monitoring camera 30A connects to master device 10 using the wireless LAN and transmits the image data captured by imaging unit 312 and the audio data collected by microphone 328 to master device 10 (S105).

When smartphone 50 receives a monitoring instruction, for example, to start up an application for a monitoring camera from the user (S106), smartphone 50 requests master device 10 to transmit image/audio data (S107). Master device 10 transmits the image data and the audio data transmitted from the monitoring camera 30A to smartphone 50 in response to the request for transmission of the image/audio data from smartphone 50 (S108). Accordingly, smartphone 50 can display the image captured by monitoring camera 30A on touch panel 503.

Next, an operation of setting and changing the sensor setting values of each sensor 40 will be described with reference to FIG. 7. FIG. 7 is a diagram illustrating an example of registration content of setting table 71 stored in storage unit 103 of master device 10. Here, for easy understanding of description, sensors 40 (specifically, human sensor 40A, smoke sensor 40B, human sensors 40C, 40D, and 40E, and opening and closing sensor 40F) are indicated by sensors a, b, c, d, e, and f for convenience. Further, similarly, monitoring camera 30A, indoor camera 30B, and monitoring camera 30C are indicated by cameras AA, BB, and CC. Further, similarly, group 7A, 7B, and 7C are indicated by group A, B, and C.

Sensor setting information including information (grouping) indicating the group and sensor setting values are registered in setting table 71 illustrated in FIG. 7. Specifically, group A to which sensor a belongs and a sensor setting value of sensor a, group B to which sensors b and f belong and sensor setting values of sensors b and f, and group C to which sensors c, d, and e belong and sensor setting values of sensors c, d, and e are registered. In this embodiment, groups A, B, and C are imaging ranges of cameras AA, BB, and CC, and correspond to cameras AA, BB, and CC on a one to one basis, as described above.

Further, the sensor setting values, for example, the sensitivity, the threshold value, the ON/OFF setting, and the operating time can be at least set and changed. The sensitivity is detection sensitivity of sensor 40. When the sensitivity increases, a sensor output value increases. The threshold value is a value that is compared with the sensor output value and used for determining that the sensor detects a target, that is, abnormality when the sensor output value exceeds the value. When the sensor output value exceeds the threshold values, sensor detection information (see step S101 illustrated in FIG. 6) is transmitted from sensor 40 to master device 10. The ON/OFF setting is a setting of operating/stopping sensor 40. The operating time is a time for which sensor 40 operates. These sensor setting values are examples, and other parameters may be used. Further, a setting file 28 (see FIGS. 9A and 9B) including the sensor setting value set for each sensor is stored in storage unit 103.

Figure 9A:
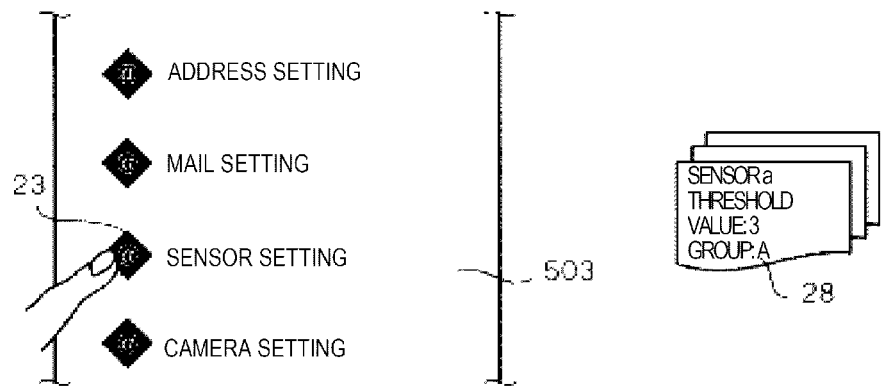
FIG. 9A is a diagram illustrating an operation of changing sensor setting values.
Figure 9B:
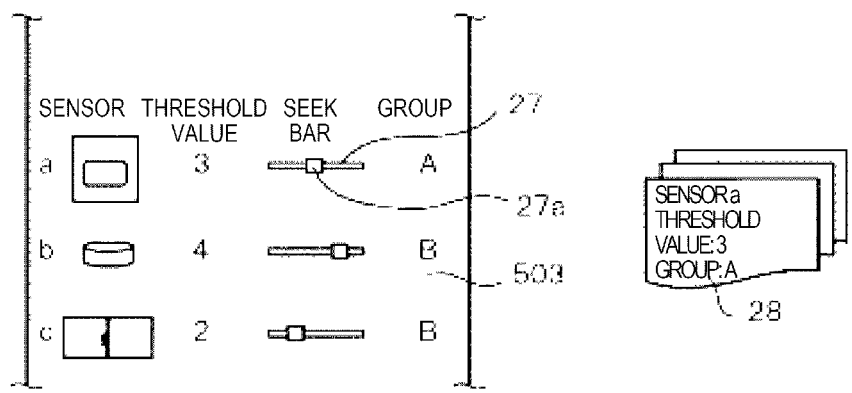
FIG. 9B is a diagram illustrating an operation of changing sensor setting values.

FIG. 8 is a sequence diagram illustrating a flow of a sensor setting operation in monitoring camera system 5 of the first embodiment. FIGS. 9A and 9B are diagrams illustrating an operation of changing the sensor setting values. When a user taps icon 23 of a sensor setting function among icons of various setting functions displayed on touch panel 503 of smartphone 50 as illustrated in FIG. 9A (S11), smartphone 50 starts up an application for the sensor setting function, and requests master device 10 to provide sensor setting information (S12).

Master device 10 reads the registration content of setting table 71 stored in storage unit 103 (S13) and transmits the sensor setting information to smartphone 50 (S14). Smartphone 50 displays a sensor setting value operation screen on touch panel 503 (S15).

Figure 10:
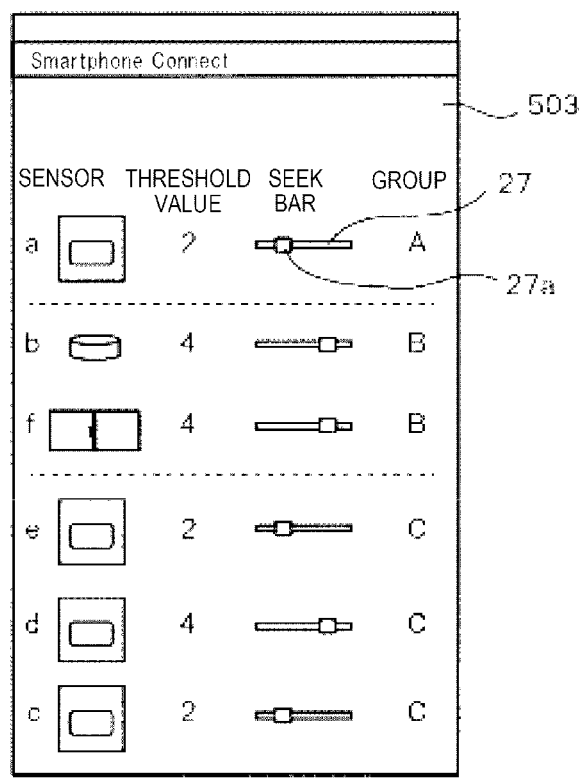
FIG. 10 is a diagram illustrating a sensor setting value operation screen displayed on a touch panel of the smartphone.

FIG. 10 is a diagram illustrating the sensor setting value operation screen displayed on touch panel 503 of smartphone 50. In the sensor setting value operation screen illustrated in FIG. 10, a sensor icon, a threshold value, a seek bar 27, and the group are displayed for each sensor. For example, when the user designates the group and moves a slider 27a on seek bar 27, which is displayed adjacent to the threshold value, in a right and left direction of a paper surface of FIG. 10, the threshold value is changed. The sensitivity may be changed in place of the threshold value.

When smartphone 50 receives an operation of changing the sensor setting values, which is performed by the user designating the group (S16), smartphone 50 transmits the sensor setting information collectively changed for each group to master device 10 (S17). Master device 10 updates setting table 71 stored in storage unit 103 according to the sensor setting information transmitted from smartphone 50 (S18).

Figure 9C:
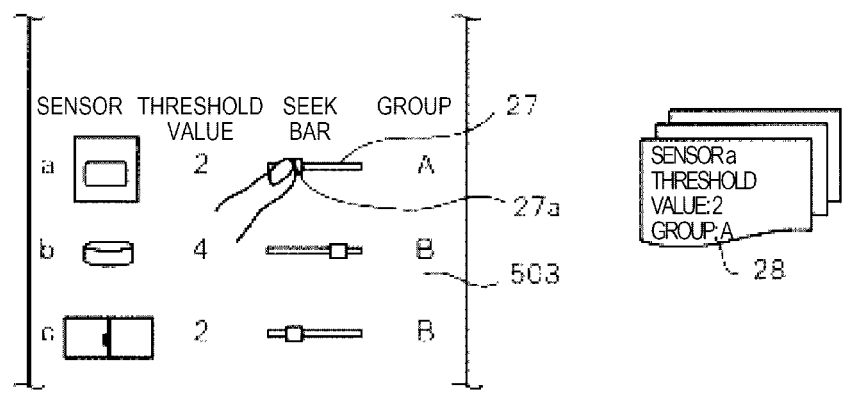
FIG. 9C is a diagram illustrating an operation of changing sensor setting values.

For example, when the threshold value 3 of sensor a before changing as illustrated in FIG. 9B is changed to the threshold value 2 of sensor a after changing as illustrated in FIG. 9C, content of setting file 28 of sensor a and setting table 71 stored in storage unit 103 of master device 10 is updated.

Thus, in monitoring camera system 5 of this embodiment, when smartphone 50 receives the tap operation for the sensor icon displayed on touch panel 503, smartphone 50 requests master device 10 to provide the sensor setting information. Smartphone 50 displays the sensor setting information transmitted from master device 10 on touch panel 503. The user goes to, for example, the group that is an actual updating target, designates the group displayed on touch panel 503, and performs an operation of changing the threshold value while confirming (experiencing) a result of comparing a sensor output value of sensor 40 with the threshold value using seek bar 27 of sensor 40 designated for each group.

When smartphone 50 receives this operation, smartphone 50 transmits information of the changed threshold value to master device 10. Master device 10 updates setting table 71 stored in storage unit 103 using the information of the threshold value transmitted from smartphone 50.

Accordingly, the user can easily perform an operation of setting and updating the sensor setting information of each sensor 40 using easily viewable touch panel 503 of smartphone 50.

Further, since the human sensor is used as sensor 40, the user can carry smartphone 50, confirm that the user is detected by sensor 40, and set and update the sensor setting information.

Further, the threshold value is displayed together with a sensor icon indicating each sensor to be adjacent to the sensor icon and to be able to be changed by an operation of seek bar 27 on touch panel 503. Accordingly, an operation of changing the threshold value for each sensor is facilitated.

Further, it is possible to perform collective setting for each zone or to perform switching to the same behavior in the same zone by setting groups according to the zone (section) such as a place or a room in which each sensor is installed. For example, it is possible to collectively perform the operations of setting and updating the sensor setting information of respective sensors 40 installed in the same zone.

Thus, since the sensor setting values are collectively set for each zone, the user enters the zone to deliberately cause the user to be detected by a plurality of sensors in the zone, such that the sensor setting values of the sensors belonging to the zone can be collectively set to an appropriate value from a result of the detection. Therefore, according to monitoring camera system 5 of this embodiment, work of setting the setting values of the sensors is simplified.

Second Embodiment

The case in which sensor setting values of one or a plurality of sensors 40 belonging to the same group are individually set has been described in the first embodiment described above.

A case in which threshold values of one or a plurality of sensors 40 associated with one camera 30 are collectively set will be described in a second embodiment.

Further, in the first embodiment, the zone and the camera correspond on a one to one basis by setting the imaging range of the camera as the zone, whereas in the second embodiment, a previously set region may be set as a zone, and a plurality of cameras may be installed in this region, or no camera may be installed.

In the second embodiment, one camera is added to zone C and two monitoring cameras 30C and 30D (camera CC and camera DD) are installed, unlike in the first embodiment. Further, in the second embodiment, when the threshold values of the sensors are collectively set for each zone, only the sensors associated with the designated camera are selected and set.

The monitoring camera system of the second embodiment has substantially the same configuration as that of the first embodiment. The same components as those in the first embodiment are denoted with the same reference signs, and description thereof will be omitted.

Figure 11:
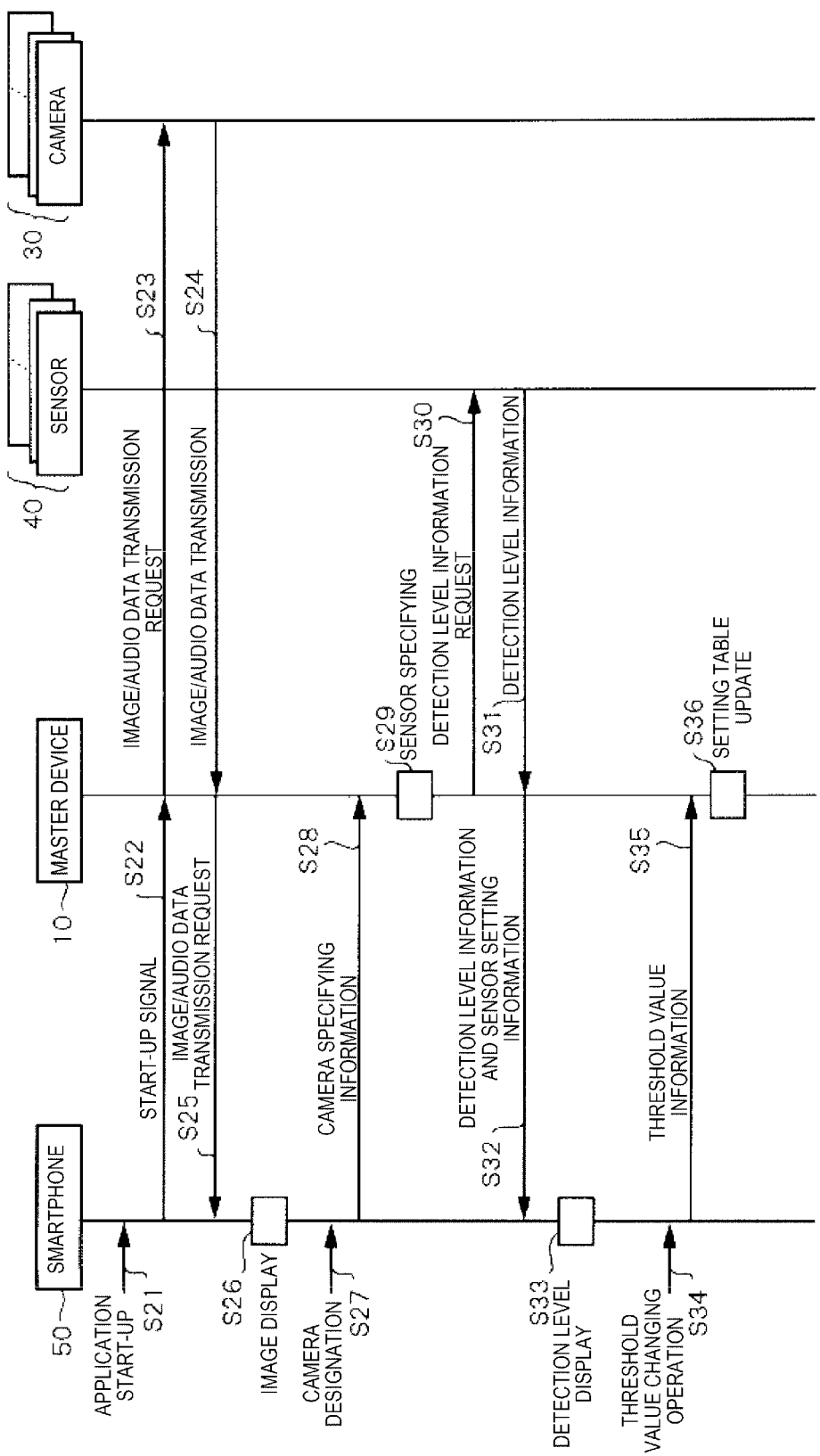
FIG. 11 is a sequence diagram illustrating a flow of a sensor setting operation in a monitoring camera system of a second embodiment.

FIG. 11 is a sequence diagram illustrating a flow of a sensor setting operation in monitoring camera system 5 of the second embodiment.

When the user taps the icon for a sensor camera setting function displayed on touch panel 503 of smartphone 50 (S21), smartphone 50 starts up an application for a sensor camera setting function and transmits a start-up signal to master device 10 (S22).

When master device 10 receives the start-up signal from smartphone 50, master device 10 requests the plurality of cameras 30 to transmit image/audio data (S23). When the plurality of cameras 30 receive the request for transmission of image/audio data, cameras 30 connect to master device 10 using the wireless LAN and transmit the image data captured by imaging unit 312 and the audio data collected by microphone 328 to master device 10 (S24). Master device 10 transmits the image data and the audio data transmitted from the plurality of cameras 30 to smartphone 50 (S25).

Figure 12:
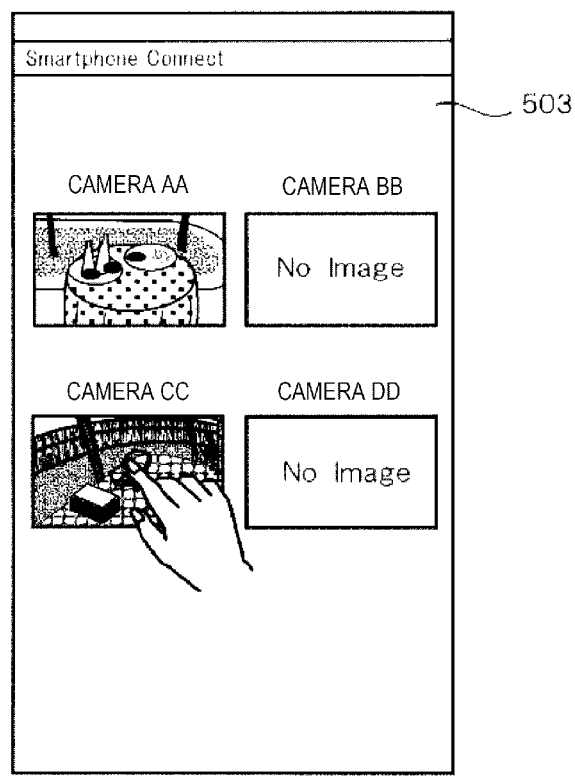
FIG. 12 is a diagram illustrating a screen of a touch panel on which a plurality of images captured by a plurality of cameras are displayed.

Smartphone 50 displays the image captured by each camera 30 on touch panel 503 using the image data and the audio data transmitted from the plurality of cameras 30 (S26). FIG. 12 is a diagram illustrating a screen of touch panel 503 on which a plurality of images captured by the plurality of cameras 30 are displayed. Here, camera CC is designated.

When the user goes to a zone (for example, zone C) that is an actual updating target, views an image displayed on touch panel 503 of smartphone 50 gripped by the user, and designates, for example, one camera 30 capturing an image in which the user is captured (S27), smartphone 50 transmits information (camera specifying information) of this designated camera 30 to master device 10 (S28).

Figures 13, 14:
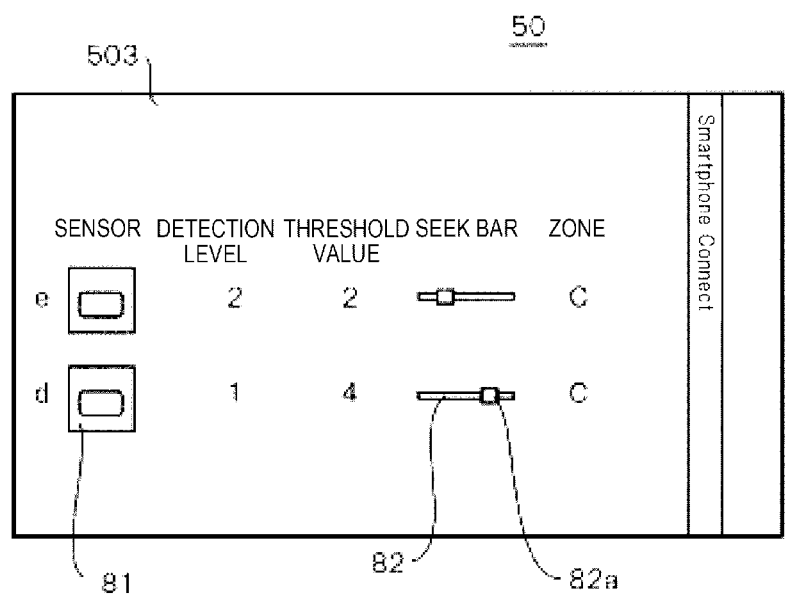
FIG. 13 is a diagram illustrating an example of registration content of an association table.
FIG. 14 is a diagram illustrating a changing operation screen on which a threshold value of each sensor displayed on a touch panel is changed.

In FIG. 12, camera CC is designated. Master device 10 specifies sensor 40 associated with designated camera 30 using association table 75 (see FIG. 13) stored in storage unit 103 (S29). FIG. 13 is a diagram illustrating an example of registration content of association table 75. Sensor 40 associated with camera 30 in each zone is registered in association table 75 illustrated in FIG. 13.

Master device 10 requests all specified sensors 40 to provide detection level information (S30). Each sensor 40 transmits the detection level information to master device 10 in response to this request for the detection level information (S31). Master device 10 transmits the detection level information transmitted from each sensor 40 to smartphone 50 together with the sensor setting information (S32).

Smartphone 50 displays the detection level information transmitted from each sensor 40 together with sensor icon 81 and the threshold value to be adjacent to the threshold value on touch panel 503 (S33). FIG. 14 is a diagram illustrating a changing operation screen on which the threshold value of each sensor displayed on touch panel 503 is changed. Here, the changing operation screen when camera C is designated is shown. A seek bar 82 for changing this threshold value is displayed adjacent to the threshold value on touch panel 503. The threshold value is changed by the user moving slider 82a on seek bar 82 in a right and left direction in FIG. 14. Sensitivity may be changed in place of the threshold value.

When the user performs an operation for changing the threshold value displayed on touch panel 503 (S34), smartphone 50 transmits information of the changed threshold value to master device 10 (S35). Master device 10 changes the threshold value registered in setting table 71 stored in storage unit 103 (S36).

In this monitoring camera system 5, for example, since the user actually enters zone C, the user is imaged by camera 30 in the zone. The user views an image transmitted to smartphone 50 due to this imaging, and designates camera 30 imaging the user. Further, the user views a detection level of at least one sensor 40 corresponding to this designated camera 30 on the screen of touch panel 503, and changes the sensor setting value of each sensor 40. For example, changing to set the threshold value to a low value or increase sensitivity is performed on sensor 40 of which the detection level is low.

Accordingly, the user can easily change the sensor setting value (the threshold value and the sensitivity) of sensor 40 associated with the designated camera 30, using easily viewable touch panel 503 of smartphone 50. Further, the sensor setting values (the threshold values and the sensitivities) of the plurality of sensors 40 in the zone associated with camera 30 can be collectively set to appropriate values, and work of setting and changing the sensor setting values is simplified.

Third Embodiment

In the first embodiment described above, the group to which one or a plurality of sensors belong is set in advance, whereas in a third embodiment, a case in which a user sets a group to which one or a plurality of sensors belong from an image captured by a camera will be described.

A monitoring camera system of the third embodiment has substantially the same configuration as that of the first embodiment. The same components as those in the first embodiment are denoted with the same reference numerals, and description thereof will be omitted.

Figure 15:
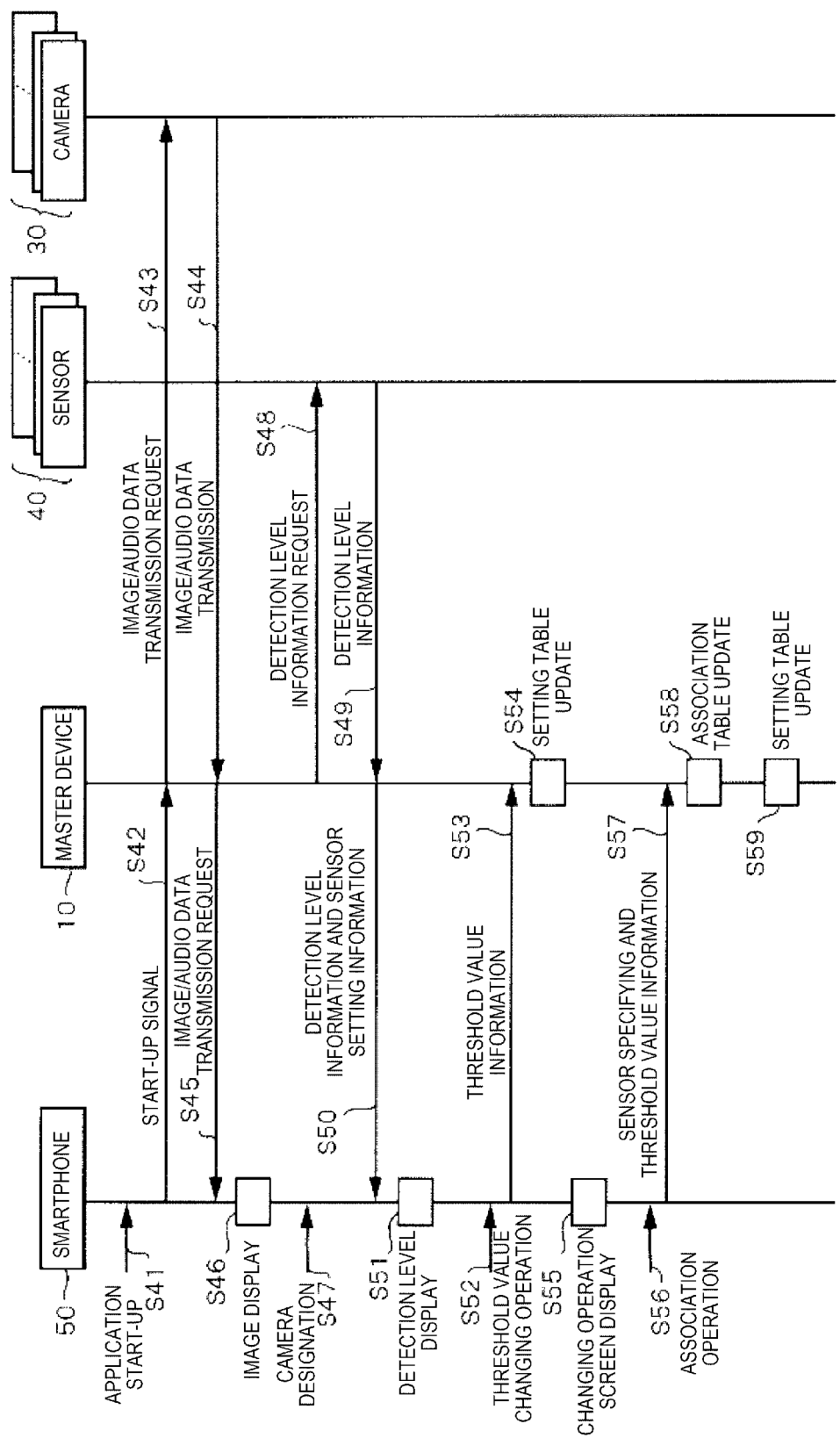
FIG. 15 is a sequence diagram illustrating a flow of a sensor setting operation in a monitoring camera system of a third embodiment.

FIG. 15 is a sequence diagram illustrating a flow of a sensor setting operation in monitoring camera system 5 of the third embodiment. When the user taps the icon for a sensor camera setting function displayed on touch panel 503 of smartphone 50, similarly to the second embodiment described above (S41), smartphone 50 starts up an application for a sensor camera setting function and transmits a start-up signal to master device 10 (S42).

Master device 10 requests the plurality of cameras 30 to transmit the image/audio data (S43). When the plurality of cameras 30 receive the request for transmission of image/audio data, respective cameras 30 connect to master device 10 using the wireless LAN and transmit image data captured by imaging unit 312 and audio data collected by microphone 328 to master device 10 (S44). Further, master device 10 transmits the image data and the audio data transmitted from the plurality of cameras 30 to smartphone 50 (S45).

Smartphone 50 displays an image (see FIG. 12) captured by each camera 30 on touch panel 503 using the image data and the audio data transmitted from the plurality of cameras 30 (S46).

A user views the image displayed on touch panel 503 and designates, for example, one camera 30 capturing a desired image or an image in which the user is captured (S47). Accordingly, only image data transmitted from designated camera 30 is displayed on touch panel 503. Here, camera AA is assumed to be designated as a camera that is transmitting the image, unlike in the second embodiment described above.

Master device 10 requests all sensors 40 to transmit detection level information (S48). Each sensor 40 transmits the detection level information to master device 10 in response to this request for the detection level information (S49). Master device 10 transmits the detection level information transmitted from all sensors 40 to smartphone 50 together with the sensor setting information (S50).

Smartphone 50 displays the detection level information transmitted from each sensor 40 on touch panel 503 to be adjacent to the threshold value, together with sensor icon 81 and the threshold value, similarly to FIG. 14 described above (S51). However, in this case, displaying is performed for all sensors 40.

When the user performs an operation for changing the threshold value displayed on touch panel 503 (S52), smartphone 50 transmits information of the changed threshold value to master device 10 (S53). Master device 10 changes the threshold value registered in setting table 71 stored in storage unit 103 (S54).

After transmitting the information of the threshold value to master device 10, smartphone 50 displays an operation screen on which an association between designated camera 30 (camera AA) that is transmitting the image and sensor 40 is changed (S55).

Figure 16:
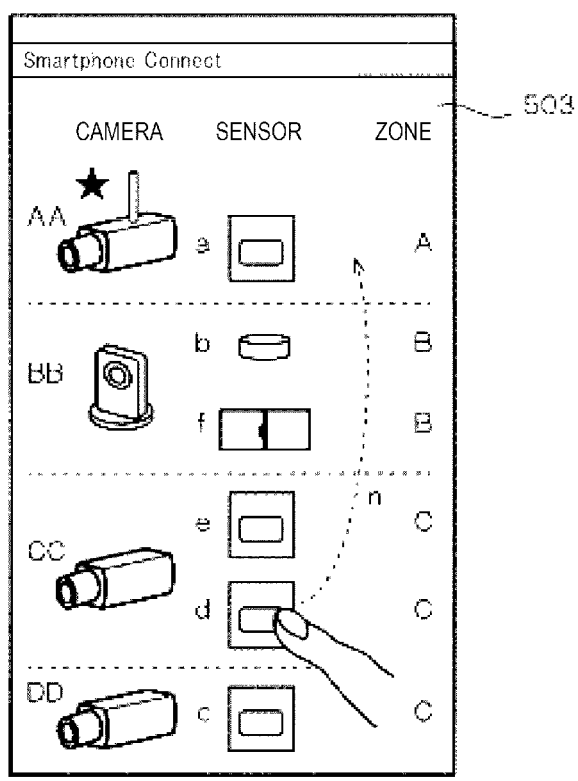
FIG. 16 is a diagram illustrating an operation screen on which association between a camera and the sensor during image transmission is changed.

FIG. 16 is a diagram illustrating an operation screen on which an association between camera 30 that is transmitting an image and sensor 40 is changed. A star mark is given to a camera icon indicating camera AA that is transmitting an image. The user performs, for example, a predetermined input operation (for example, a drag operation) as indicated by an arrow n in FIG. 16 to move sensor d associated with camera CC to be associated with designated camera AA that is transmitting an image.

When an association operation for sensor 40 is performed on designated camera A that is transmitting an image (S56), smartphone 50 transmits this association information to master device 10 (S57). Master device 10 updates association table 75A (see FIG. 17A) stored in storage unit 103 according to the transmitted association information (S58).

FIGS. 17A and 17B are diagrams illustrating a change in registration content of association table 75A and setting table 71A after changing. In the association table 75A, as indicated by an arrow m in FIG. 17A, sensor d associated with camera C is deleted, and registered to be associated with camera A instead, as illustrated in FIG. 17A.

Further, master device 10 changes a zone to which sensor d registered in setting table 71A belongs from zone C to zone A corresponding to designated cameras 30 that is transmitting an image, to update setting table 71A, as illustrated in FIG. 17B (S59).

In the monitoring camera system of the third embodiment, the user only views the image captured by the designated camera that is transmitting the image and selects the sensor associated with this camera, such that the selected sensor is set to belong to the same zone corresponding to this camera. That is, the user can simply set the zone to which the sensor belongs using the easily viewable touch panel of the smartphone.

Fourth Embodiment

In a fourth embodiment, a communication system that collectively sets behaviors of a plurality of home plugs according to detection of a sensor in a group to which one or a plurality of sensors and one or a plurality of home plugs belong will be described.

The communication system of the fourth embodiment includes a plurality of home plugs to which a plurality of cameras can connect, in addition to the configuration of the monitoring camera system of the first embodiment described above. The communication system may include home plugs to which other devices can connect, in place of the camera.

FIG. 18 is a block diagram illustrating an example of an internal configuration of home plug 80 in communication system 5A of the fourth embodiment in detail. Home plug 80 illustrated in FIG. 18 includes a control unit 847, a storage unit 842, and a display unit 845 including a display lamp. Home plug 80 performs communication with smartphone 50 or master device 10 such that a settable or changeable ON/OFF condition setting is registered in storage unit 842, as described below.

Further, home plug 80 includes DECT protocol control unit 849, and DECT wireless I/F unit 848, performs wireless connection to master device 10 in a DECT wireless scheme, and switches supplying or blocking of a commercial alternating current power supply to each device connected to home plug 80 according to a signal transmitted through this wireless connection.

Further, home plug 80 includes a switch unit 850. Switch unit 850 performs connection or blocking of a power supply line between plug terminal 851 and outlet terminal 852. Switch unit 850 is driven by solenoid coil 853. By flowing a driving current from the alternating current power supply to solenoid coil 853, switch unit 850 is closed to connect plug terminal 851 to outlet terminal 852. Further, switch unit 850 turns the driving current flowing through solenoid coil 853 ON/OFF under control of control unit 847.

Current detection element 855 is provided between plug terminal 851 and switch unit 850, and when a current flows between plug terminal 851 and outlet terminal 852, the current detection element 855 detects the current and transmits a detection signal to control unit 847.

FIG. 19 is a sequence diagram illustrating a flow of power supply control of the fourth embodiment. For example, a setting is performed for group D (see FIGS. 20A and 20B) indicated by group D so that human sensor 40A and a plurality of home plugs 80 (home plugs A1, B1, and C1 illustrated in FIG. 20B) installed in the same room cooperate with each other. Here, so as to simplify description, in FIG. 19, only home plug 80A (that is, a home plug corresponding to home plug A1 illustrated in FIG. 20B) is shown, and other home plugs 80B and 80C are omitted.

In FIG. 19, when human sensor 40A detects a target such as a person present in the room, human sensor 40A transmits sensor detection information including information (presence) indicating that the target has been detected and an output value of the sensor (for example, a detection level as a sensing result) to master device 10 (S801). When master device 10 receives the sensor detection information from human sensor 40A, master device 10 wirelessly connects to smartphone 50 using the wireless LAN (S802). When connection is completed, master device 10 transmits the sensor detection information to smartphone 50 (S803).

Further, master device 10 transmits a closing instruction for closing switch unit 850 to home plug 80A (and other home plugs 80B and 80C) (S804). Home plug 80A turns the driving current of solenoid coil 853 ON according to a signal of the close instruction transmitted from master device 10 through wireless connection, to close switch unit 850 and cause the power supply line to external device to enter a state in which conduction is possible.

Current detection element 855 of home plug 80A outputs a signal indicating a power consumption state of the external device to control unit 847, and power consumption monitoring information is transmitted from home plug 80A to master device 10 through wireless connection according to the detection signal (S805).

In smartphone 50, the sensor detection information is displayed. When the user of smartphone 50 notices the displayed sensor detection information and desires to monitor a state of indoor power consumption, the user can operate touch panel 503 of smartphone 50 to perform a monitoring instruction.

When smartphone 50 receives the monitoring instruction from the user (S806), smartphone 50 transmits a power monitoring request to master device 10 (S807). Master device 10 transmits the power consumption monitoring information from home plug 80A to smartphone 50 in response to the power monitoring request from smartphone 50 (S808). Accordingly, smartphone 50 can display a power supply state to a device indoors (S809).

Further, according to the setting of human sensor 40A, if human sensor 40A does not detect a target such as a person present indoors even when a certain period of time lapses, human sensor 40A transmits sensor detection information including information (absence) indicating that no target is detected and an output value of the sensor (for example, a detection level as a sensing result) to master device 10 (S810). When master device 10 receives the sensor detection information (absence) from human sensor 40A, master device 10 wirelessly connects to smartphone 50 using the wireless LAN (S811). When the connection is completed, master device 10 transmits the sensor detection information to smartphone 50 (S812).

When smartphone 50 receives this sensor detection information (absence), smartphone 50 displays "absence" information indicating that no target is detected on touch panel 503 (S813).

The user of smartphone 50 can view the "absence" information and instruct to block the power. When smartphone 50 receives a power blocking instruction (S814), smartphone 50 transmits a blocking request to master device 10 (S815). When master device 10 receives this blocking request, master device 10 requests home plug 80A to block the power (S816). Home plug 80A turns the driving current of solenoid coil 853 OFF according to a signal of the blocking request transmitted from master device 10 through the wireless connection to open switch unit 850 and causes the power supply line to the external device to enter a non-conduction state.

Next, updating of the sensor setting information and the setting information of the home plug will be described. FIG. 20A is a diagram illustrating an example of registration content of setting table 71B indicating the sensor setting information stored in storage unit 103 of master device 10. Sensor 40 and the sensor setting information belonging to each group are registered in setting table 71B for each group. For example, sensor d and its sensor setting value are registered in group A. Sensors b and f and their sensor setting values are registered in group B. Sensors e and c and their setting values are registered in group C. Sensor a and its sensor setting value are registered in group D.

FIG. 20B is a diagram illustrating an example of registration content of setting table 71C indicating the setting information of home plug 80 stored in storage unit 103 of master device 10. Here, for easy understanding of description, a plurality of home plugs 80A, 80B, 80C, 80D, etc. are indicated by A1, B1, C1, D1, etc. Home plug 80 and the setting information of home plug 80 belonging to each group are registered in setting table 71C for each group. For example, home plugs A1, B1, and C1 and respective ON/OFF condition settings are registered in group D.

FIG. 21 is a sequence diagram illustrating a flow of a setting operation of home plug 80 in communication system 5A of the fourth embodiment. When the user taps the icon for a setting function of home plug 80 displayed on touch panel 503 of smartphone 50 (S911), smartphone 50 requests master device 10 to provide the setting information of home plug 80 (S912).

Master device 10 reads the registration content of setting table 71C stored in storage unit 103 (S913) and transmits the setting information of home plug 80 to smartphone 50 (S914). Smartphone 50 displays a setting value operation screen for home plug 80 on touch panel 503 (S915).

When smartphone 50 receives an operation of changing the setting value of home plug 80, which is performed by the user designating the group (S916), smartphone 50 transmits home plug setting information collectively changed for each group to master device 10 (S917). Master device 10 updates setting table 71C stored in storage unit 103 according to the home plug setting information transmitted from smartphone 50 (S918).

Figure 22A:
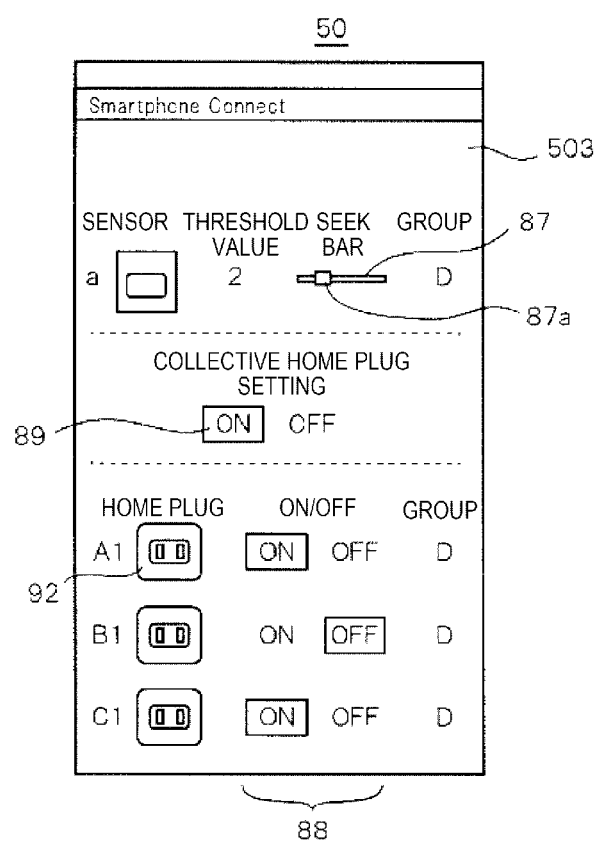
FIG. 22A is a diagram illustrating an operation of changing a setting of a home plug in the fourth embodiment.
Figure 22B:
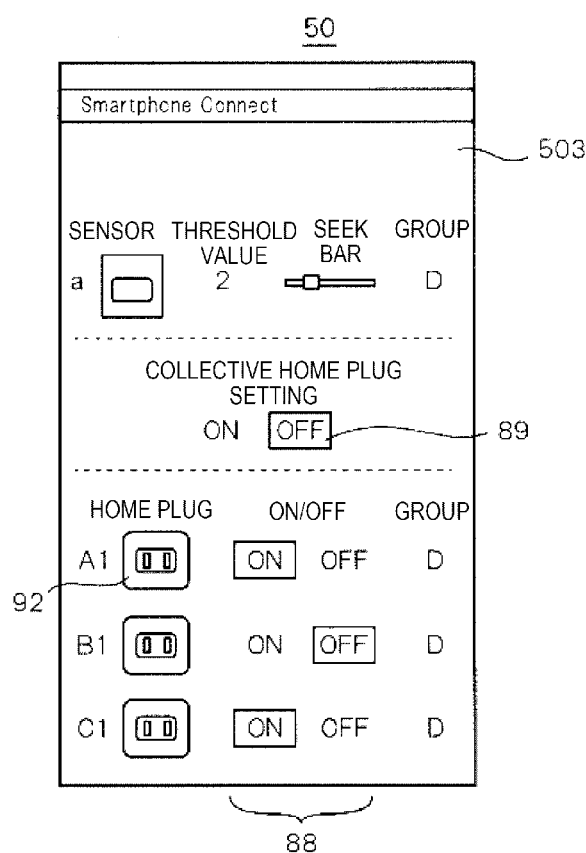
FIG. 22B is a diagram illustrating an operation of changing a setting of a home plug in the fourth embodiment.

FIGS. 22A and 22B are diagrams illustrating an operation of changing the setting information of home plug 80 in the fourth embodiment. In FIGS. 22A and 22B, a setting value operation screen for the sensors and home plugs 80A (A1), 80B (B1), and 80C (C1) set to belong to the same group as the sensors are displayed on touch panel 503 of smartphone 50.

On the setting value operation screen illustrated in FIGS. 22A and 22B, a sensor icon, a threshold value, seek bar 87, and a group are displayed for each group. For example, when a user designates group D and moves a slider 87a on seek bar 87 displayed adjacent to the threshold value in a right and left direction of a screen of FIG. 22A or 22B, the threshold value of human sensor 40A belonging to group D is changed. Sensitivity may be changed in place of the threshold value.

When smartphone 50 receives an operation of changing the sensor setting value from the user, smartphone 50 transmits sensor setting information collectively changed for each zone to master device 10, and master device 10 updates setting table 71B (see FIG. 20A) stored in storage unit 103 according to the sensor setting information transmitted from smartphone 50.

Further, icons 88 for setting [ON]/[OFF] in default states of respective home plugs 80A, 80B, and 80C set to belong to the same group are displayed on touch panel 503 of smartphone 50 together with seek bar 87 of human sensor 40A. Further, icon 89 for collectively changing a setting for simultaneously controlling [ON]/[OFF] of the respective home plugs according to a change in a state of human sensor 40A of the same group is displayed on touch panel 503.

When smartphone 50 receives a [ON]/[OFF] changing operation in a default state of each of home plugs 80A, 80B, and 80C from the user, smartphone 50 transmits the setting information to master device 10. When master device 10 receives this setting information, ON/OFF condition settings in the respective default states of home plugs 80A, 80B, and 80C are updated in setting table 71C stored in storage unit 103.

Further, when smartphone 50 receives the changing operation through icon 89 for collectively changing the setting of home plug 80 from the user, smartphone 50 transmits the setting information to master device 10. When master device 10 receives this setting information, master device 10 collectively updates the setting so that all home plugs are simultaneously controlled to [ON] or [OFF] according to the change in the state of human sensor 40A in setting table 71C stored in storage unit 103.

In FIG. 22A, an example in which a state of icon 89 for collectively changing the settings of the respective home plugs on touch panel 503 is [ON] is shown. First, an area in which "collective home plug setting" is, for example, double tapped to change a display color so as to validate a collective home plug setting. The collective home plug setting is set to "ON" by tapping "ON" of icon 89.

When the collective home plug setting is set "ON," home plugs 80A, 80B, and 80C are all controlled to be [ON], that is, a power supply state when the state of human sensor 40A in the same group is a state in which "presence" is detected.

When the user desires to collectively change this setting, the user taps [OFF] of icon 89 on touch panel 503. When the user taps [OFF] of icon 89 on touch panel 503, the information is transmitted to master device 10. Master device 10 collectively updates setting table 71C stored in storage unit 103. Thereafter, even when a state of human sensor 40A is a state in which "presence" is detected, home plugs 80A, 80B, 80C are all controlled into [OFF], that is, a state in which the power supply is not performed. In FIG. 20B, an example in which the state of icon 89 for collectively changing the setting of the respective home plugs on touch panel 503 is [OFF] is shown.

Thus, in communication system 5A of the fourth embodiment, smartphone 50 divides the information for specifying sensor 40 transmitted from master device 10 and the setting information of home plug 80 for each group and displays the information on touch panel 503. When smartphone 50 receives the operation of changing the setting information of home plug 80 for each group, smartphone 50 transmits the setting information of home plug 80 changed according to the designated group to master device 10. Master device 10 collectively updates the setting information of home plug 80 transmitted from smartphone 50 for each group.

Accordingly, communication system 5A can simplify the operation of setting and updating the setting information of home plug 80 installed in each group through easily viewable touch panel 503 of smartphone 50 carried by the user, and easily set and update the setting information of home plug 80. Further, it is possible to collectively perform the operation of setting and updating the setting information of home plug 80 for each group. Further, power saving is achieved by blocking the power supply of home plug 80 that is not necessary.

Further, it is possible to individually set and update the setting information of home plug 80. Further, the user can view the power consumption monitoring information transmitted from home plug 80 and appropriately set and update home plug 80.

While various embodiments have been described above with reference to the drawings, it is understood that the present invention is not limited to such embodiments. It is apparent that various change examples or modification examples can be derived in the category defined in claims by those skilled in the art, and it is understood that these belong to the technical scope of the present invention.

For example, while the case in which the present invention is applied to the monitoring camera system has been shown in the above-described embodiment, the present invention is applicable to various communication systems using a sensor. Further, while the home plug is listed as an example of the controlled device in the communication system of the fourth embodiment, the controlled device may be a device that can connect to a network, such as a recorder, a speaker, or a light.

What is claimed is:

1. A communication system comprising:
   a first camera arranged in a first zone;
   a first sensor associated with the first camera;
   a second camera and a third camera arranged in a second zone different from the first zone;
   a second sensor associated with the second camera in the second zone;
   a third sensor and a fourth sensor associated with the third camera in the second zone; and
   a master device that, in operation, performs wireless communication with the first, second and third cameras and the first, second, third and fourth sensors according to a communications protocol, wherein the master device includes a storage configured to store setting information of the first, second, third and fourth sensors including ON/OFF settings of the first, second, third and fourth sensors;
   wherein the master device,
   in response to receiving a user selection of one of the first camera, the second camera, and the third camera, via a wireless router from a smartphone connected to a mobile phone network, transmits the setting information of those sensor(s) associated with the selected camera to the smartphone for display;

in response to receiving an update to the setting information of the first sensor from the smartphone when the user has selected the first camera in the first zone, updates the setting information of the first sensor;

in response to receiving an update to the setting information of the second sensor from the smartphone when the user has selected the second camera in the second zone, updates the setting information of the second sensor, and in response to receiving an update to the setting information of the third sensor and the fourth sensor from the smartphone when the user has selected the third camera in the second zone, updates the setting information of the third sensor and the fourth sensor in a batch.

2. The communication system of claim 1, wherein the setting information includes operating time settings of the first, second, third and fourth sensors.

3. The communication system of claim 1, wherein the setting information includes at least one of sensitivity settings of the first, second, third and fourth sensors and threshold values of the first, second, third and fourth sensors.

4. The communication system of claim 3, wherein the update to at least one of the sensitivity settings of the first, second, third and fourth sensors and the threshold values of the first, second, third and fourth sensors is inputted via user operation of a seek bar displayed on the smartphone.

5. The communication system of claim 1, wherein at least some of the first, second, third and fourth sensors are infrared sensors.

6. The communication system of claim 1, wherein the first, second, third and fourth sensors are selected from a group consisting of human sensors, smoke sensors, and opening/closing sensors.

7. The communication system of claim 1, wherein the third sensor and the fourth sensor are located within an imaging range of the third camera.

8. A communication method based on a communication system, the communication system comprising: (a) a first camera arranged in a first zone; a first sensor associated with the first camera; (b) a second camera and a third camera arranged in a second zone different from the first zone; a second sensor associated with the second camera in the second zone; a third sensor and a fourth sensor associated with the third camera in the second zone; and (c) a master device that, in operation, performs wireless communication with the first, second and third cameras and the first, second, third and fourth sensors according to a communications protocol, wherein the master device includes a storage configured to store setting information of the first, second, third and fourth sensors including ON/OFF settings of the first, second, third and fourth sensors; the communication method comprising:

in response to receiving, at the master device, a user selection of one of the first camera, the second camera, and the third camera, via a wireless router from a smartphone connected to a mobile phone network, transmitting the setting information of those sensor(s) associated with the selected camera to the smartphone for display;

in response to receiving, at the master device, an update to the setting information of the first sensor from the smartphone when the user has selected the first camera in the first zone, updating the setting information of the first sensor;

in response to receiving, at the master device, an update to the setting information of the second sensor from the smartphone when the user has selected the second camera in the second zone, updating the setting information of the second sensor; and in response to receiving, at the master device, an update to the setting information of the third sensor and the fourth sensor from the smartphone when the user has selected the third camera in the second zone, updating the setting information of the third sensor and the fourth sensor in a batch.

9. The communication method of claim 8, wherein the setting information includes operating time settings of the first, second, third and fourth sensors.

10. The communication method of claim 8, wherein the setting information includes at least one of sensitivity settings of the first, second, third and fourth sensors and threshold values of the first, second, third and fourth sensors.

11. The communication method of claim 10, wherein the update to at least one of the sensitivity settings of the first, second, third and fourth sensors and the threshold values of the first, second, third and fourth sensors is inputted via user operation of a seek bar displayed on the smartphone.

12. The communication method of claim 8, wherein at least some of the first, second, third and fourth sensors are infrared sensors.

13. The communication method of claim 8, wherein the first, second, third and fourth sensors are selected from a group consisting of human sensors, smoke sensors, and opening/closing sensors.

14. The communication method of claim 8, wherein the third sensor and the fourth sensor are located within an imaging range of the third camera.

* * * * *